US012770440B2

(12) United States Patent
Komiyama et al.

(10) Patent No.: US 12,770,440 B2
(45) Date of Patent: Oct. 20, 2026

(54) DATA PROCESSING METHOD AND COMMUNICATION SYSTEM

(71) Applicant: DENSO CORPORATION, Kariya-city (JP)

(72) Inventors: Masatoshi Komiyama, Kariya-city (JP); Keisuke Nishio, Kariya-city (JP); Shigeru Kajioka, Kariya-city (JP); Makiko Tauchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 270 days.

(21) Appl. No.: 18/397,364

(22) Filed: Dec. 27, 2023

(65) Prior Publication Data

US 2024/0127637 A1 Apr. 18, 2024

Related U.S. Application Data

(63) Continuation of application No. PCT/JP2022/024888, filed on Jun. 22, 2022.

(30) Foreign Application Priority Data

Jul. 2, 2021 (JP) ................................ 2021-110910

(51) Int. Cl.
*G07C 5/00* (2006.01)
*G06T 7/70* (2017.01)
(Continued)

(52) U.S. Cl.
CPC ................ *G07C 5/008* (2013.01); *G06T 7/70* (2017.01); *G06V 20/58* (2022.01); *H04L 67/12* (2013.01); *H04L 67/565* (2022.05)

(58) Field of Classification Search
None
See application file for complete search history.

(56) References Cited

U.S. PATENT DOCUMENTS 10,442,444 B1 * 10/2019 Bando .................... B60K 35/80
2007/0050529 A1 3/2007 Sakane
(Continued)

FOREIGN PATENT DOCUMENTS

JP 2007062481 A 3/2007
JP 2017182418 A 10/2017
(Continued)

OTHER PUBLICATIONS

U.S. Appl. No. 18/397,209, filed Dec. 27, 2023, Komiyama et al.

*Primary Examiner* — Ramon A. Mercado
*Assistant Examiner* — David Ruben Pedersen
(74) *Attorney, Agent, or Firm* — Harness, Dickey & Pierce, P.L.C.

(57) ABSTRACT

By a data processing method or a communication system, input data is acquired, first processing that is processing of reducing a data amount of the input data is performed, second processing of converting data obtained by the first processing into data having a preset format configured to be handled by an in-vehicle device unit is performed, third processing of converting data obtained by the second processing into normalization data configured to be handled by a cloud server is performed, and vehicle data is provided to the cloud server.

24 Claims, 16 Drawing Sheets

(51) Int. Cl.

| | |
|---|---|
| ***G06V 20/58*** | (2022.01) |
| ***H04L 67/12*** | (2022.01) |
| ***H04L 67/565*** | (2022.01) |

(56) References Cited

U.S. PATENT DOCUMENTS

| | | | | |
|---|---|---|---|---|
| 2009/0324367 | A1 | 12/2009 | Isozaki et al. | |
| 2010/0098095 | A1* | 4/2010 | Kato | H04L 45/306 370/401 |
| 2015/0244806 | A1 | 8/2015 | Renac et al. | |
| 2017/0206717 | A1* | 7/2017 | Kühnapfel | G06Q 40/08 |
| 2018/0088589 | A1 | 3/2018 | Hasegawa et al. | |
| 2019/0279440 | A1* | 9/2019 | Ricci | G06Q 10/20 |
| 2020/0202638 | A1 | 6/2020 | Sakurada et al. | |
| 2021/0039673 | A1 | 2/2021 | Oyama | |
| 2022/0027276 | A1 | 1/2022 | Tanibata | |
| 2022/0083346 | A1 | 3/2022 | Nagano | |
| 2022/0100574 | A1 | 3/2022 | Nagano | |
| 2022/0237414 | A1* | 7/2022 | Zhang | A01G 25/16 |

FOREIGN PATENT DOCUMENTS

| | | | |
|---|---|---|---|
| JP | 2018005848 | A | 1/2018 |
| JP | 2018060520 | A | 4/2018 |
| JP | 2020024685 | A | 2/2020 |
| JP | 2020101980 | A | 7/2020 |
| JP | 2020177073 | A | 10/2020 |
| JP | 2020197923 | A | 12/2020 |
| JP | 2020201762 | A | 12/2020 |
| JP | 2021024457 | A | 2/2021 |
| KR | 10-2018-0098062 | A | 9/2018 |

* cited by examiner

FIG. 8

| EXPANSION BOX | PROTOCOL TYPE (CONNECTOR TYPE) | DATA TYPE | FILTERING | |
|---|---|---|---|---|
| | | | YES/NO | CONTENTS |
| VEHICLE EXPANSION UNIT | UART | VEHICLE DATA | YES | · EXTRACT ONLY CAN ID COMMUNICATION SIGNAL<br>· CONVERT INTO CAN |
| | Ether | | YES | · EXTRACT ONLY CAN ID COMMUNICATION SIGNAL<br>· CONVERT INTO CAN |
| | GPIO | | YES | · EXTRACT ONLY CAN ID COMMUNICATION SIGNAL<br>· CONVERT INTO CAN |
| | CAN | | NO | — |
| | CAN-FD | | YES | · EXTRACT ONLY CAN ID COMMUNICATION SIGNAL<br>· CONVERT INTO CAN |
| | LIN | | YES | · EXTRACT ONLY CAN ID COMMUNICATION SIGNAL<br>· CONVERT INTO CAN |
| SENSOR EXPANSION UNIT | UART | IMAGE/MOVIE | YES | · EXTRACT IMAGE RECOGNITION RESULT<br>· CONVERT RESOLUTION |
| | | AUDIO | YES | · EXTRACT INFORMATION OF AUDIO RECOGNITION RESULT<br>· CONVERT RESOLUTION |
| | | OBSTACLE SENSOR | YES | · EXTRACT INFORMATION OF OBSTACLE DETECTION RESULT |
| | Ether | IMAGE/MOVIE | NO | — |
| | | AUDIO | NO | — |
| | | OBSTACLE SENSOR | NO | — |
| DISPLAY EXPANSION UNIT | LVDS | MOVIE | NO | — |
| USB EXPANSION UNIT | USB | IMAGE/MOVIE | NO | — |
| | | GPS INFORMATION | NO | — |
| | | AUDIO | NO | — |
| | | TOUCH PANEL | NO | — |
| NETWORK EXPANSION UNIT | Bluetooth | VARIOUS DATA | YES | · EXTRACT ONLY INSTRUCTION FROM IDENTIFIED CLOUD (DEVICE) |
| | WiFi | | YES | · EXTRACT ONLY INSTRUCTION FROM IDENTIFIED CLOUD (DEVICE) |
| | cellular | | YES | · EXTRACT ONLY INSTRUCTION FROM IDENTIFIED CLOUD (DEVICE) |

FIG. 10

23A

| CANID | ECU | POSITION | DLC | UNIQUE LABEL | RESOLUTION | OFFSET | UNIT |
|---|---|---|---|---|---|---|---|
| 0x123 | ENG | 2.0 | 8 | ETHA | 1 | 0 | °C |
| 0x123 | ENG | 3.0 | 16 | NE1 | 0.78 | 0 | rpm |

<STEERING ANGLE>=SSA(STEERING SHIT ANGLE)-SSAZ(STEERING ZERO POINT)

| UNIQUE LABEL | ECU | DATA | | | |
|---|---|---|---|---|---|
| | | TYPE | SIZE | VALUE | UNIT |
| ETHA | ENG | float | 4byte | 25.0 | °C |
| NE1 | ENG | float | 4byte | 3000 | rpm |
| ... | | | | | |

DATA PROCESSING METHOD AND COMMUNICATION SYSTEM

CROSS REFERENCE TO RELATED APPLICATIONS

The present application is a continuation application of International Patent Application No. PCT/JP2022/024888 filed on Jun. 22, 2022, which designated the U.S. and claims the benefit of priority from Japanese Patent Application No. 2021-110910 filed on Jul. 2, 2021. The entire disclosures of all of the above applications are incorporated herein by reference.

TECHNICAL FIELD

The present disclosure relates to a data processing method executed by an in-vehicle device unit and a communication system.

BACKGROUND

According to a comparative technology, an in-vehicle device is mounted on a vehicle and collects vehicle-related data from inside the vehicle and uploads the data to a predetermined server.

SUMMARY

By a data processing method or a communication system, input data is acquired, first processing that is processing of reducing a data amount of the input data is performed, second processing of converting data obtained by the first processing into data having a preset format configured to be handled by an in-vehicle device unit is performed, third processing of converting data obtained by the second processing into normalization data configured to be handled by a cloud server is performed, and vehicle data is provided to the cloud server.

BRIEF DESCRIPTION OF DRAWINGS

FIG. 8 is an explanatory diagram showing an example of a filtering table.

FIG. 10 is a diagram showing a configuration of a data conversion table.

DETAILED DESCRIPTION

Figure 1:
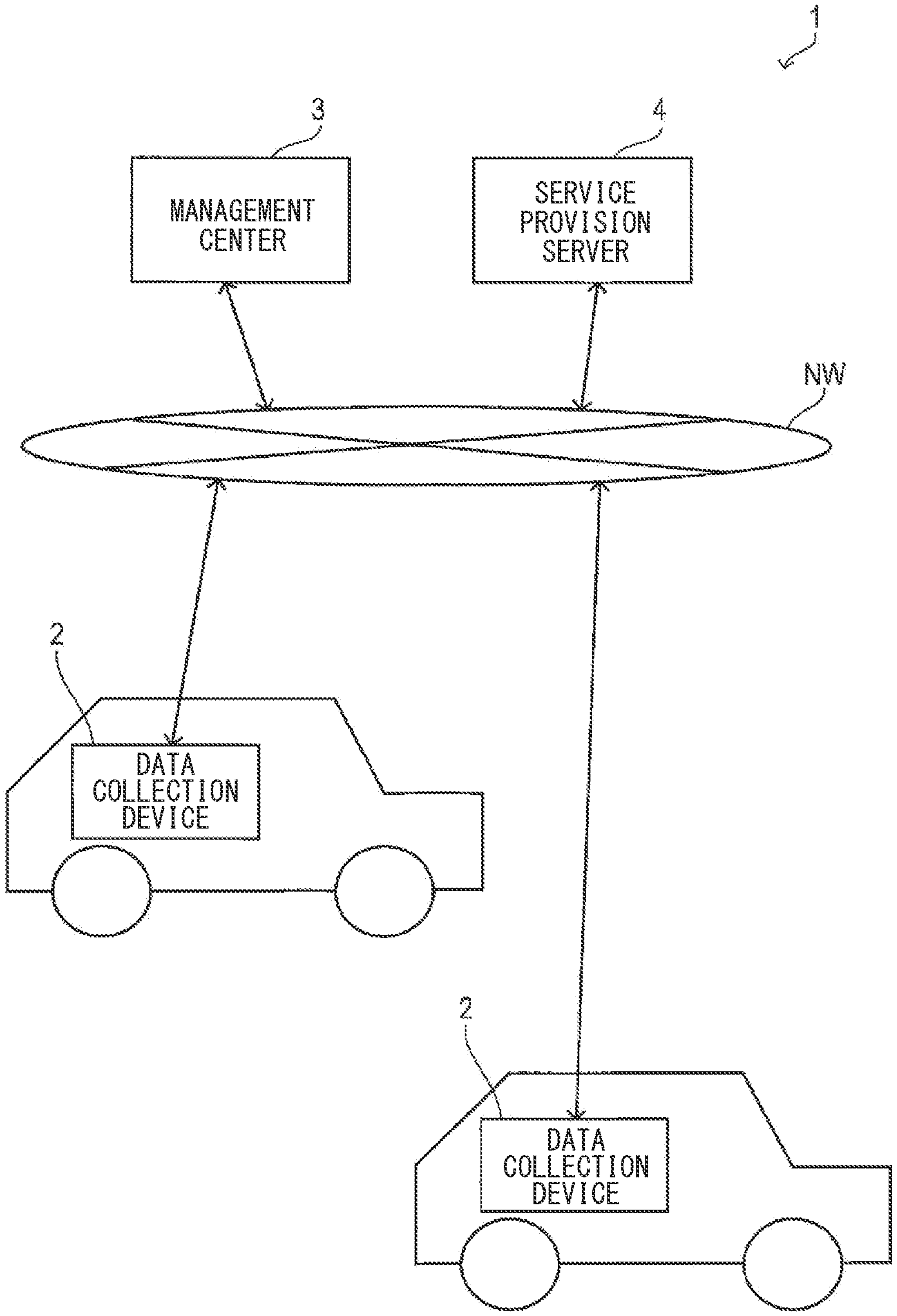
FIG. 1 is a block diagram showing a configuration of a mobility IoT system.

However, as a result of detailed study by the inventor, it has been found that data uploaded from the in-vehicle device to the server is estimated to be raw data of which meaning is not understand itself, and therefore a process for causing the server to understand the meaning of the raw data is required, so that a processing load of the server becomes large.

One example embodiment of the present disclosure is to reduce the processing load of the server in a technology for collecting data of a vehicle. Further, a function or performance of an in-vehicle device can be expanded with a low development load.

One example embodiment of the present disclosure is a data processing method executed by an in-vehicle device unit including an in-vehicle device mounted on a vehicle and a plurality of expansion units that is connectable to and disconnectable from the in-vehicle device.

The data processing method includes: acquiring input data from a provider device that is a provider of the input data; performing first processing that is processing of reducing a data amount of the input data; and performing second processing of converting data obtained by the first processing into data having a preset format configured to be handled by the in-vehicle device unit.

The data processing method further includes: performing third processing of converting data obtained by the second processing into normalization data configured to be handled by the cloud server; and providing vehicle data to the cloud server based on data obtained by the third processing.

According to such a method, it is possible to provide, to the server, the data converted in data that can be understood or handled after the first to third processing. Accordingly, as compared with a case where the server performs the first to third processing, it is possible to reduce the server processing load. Further, since the expansion unit is provided, it is possible to add a new function to the in-vehicle device only by connecting the expansion unit to the in-vehicle device.

Hereinafter, embodiments of the present disclosure will be described with reference to drawings.

(1-1. Relationship between Configuration of Embodiment and Configuration of Present Disclosure)

In an embodiment, a mobility IoT system 1 corresponds to a communication system of the present disclosure. Further, a data collection device 2 corresponds to an in-vehicle device unit of the present disclosure. In the embodiment, a main body 2A corresponds to an in-vehicle device of the present disclosure. Further, in the embodiment, a different (other) ECU, a radar 165, cameras 166 and 185, microphones 167 and 187, an acceleration sensor 168, a display 175, a GPS 186, a touch panel 188, a speaker 189, antennas 195A to 195C correspond to a provider device of the present disclosure.

Further, in the embodiment, an input I/F 155A corresponds to an acquisition unit of the present disclosure. In the embodiment, filtering units 20B and 156B correspond to a processing unit of the present disclosure. Further, standardization units 20C and 156C correspond to a second processing unit of the present disclosure. In the embodiment, a normalization unit 20D corresponds to a third processing unit of the present disclosure. Further, in the communication unit 13 corresponds to a provision unit of the present disclosure.

Further, among functions implemented by the data collection device 2, functions of the filtering units 20B and 156B corresponds to first processing of the present disclosure. Functions of the standardization units 20C and 156C corresponds to second processing of the present disclosure. Functions of the normalization unit 20D corresponds to third processing of the present disclosure. Functions of the structurization unit 20E corresponds to fourth processing of the present disclosure. Further, functions of determination unit 20A and 156A corresponds to a capability of the in-vehicle device of the present disclosure. Further, a communication unit 213 corresponds to a relay unit of the present disclosure.

(1-2. Configuration)

Embodiments of the present disclosure will be described below with reference to drawings.

As shown in FIG. 1, the mobility IoT system 1 of the present embodiment includes multiple data collection devices 2, a management center 3, and a service provision server 4. IoT is an abbreviation for Internet of Things.

The data collection device 2 is mounted on a vehicle and has a function of performing data communication with the management center 3 via a wide area wireless communication network NW.

The management center 3 is a device that manages the mobility IoT system 1. The management center 3 has a function of performing data communication with the multiple data collection devices 2 and the service provision server 4 via the wide area wireless communication network NW.

The service provision server 4 is, for example, a server installed to provide a service for managing the operation of a vehicle. The mobility IoT system 1 may include multiple service providing servers with mutually different service contents.

Figure 2:
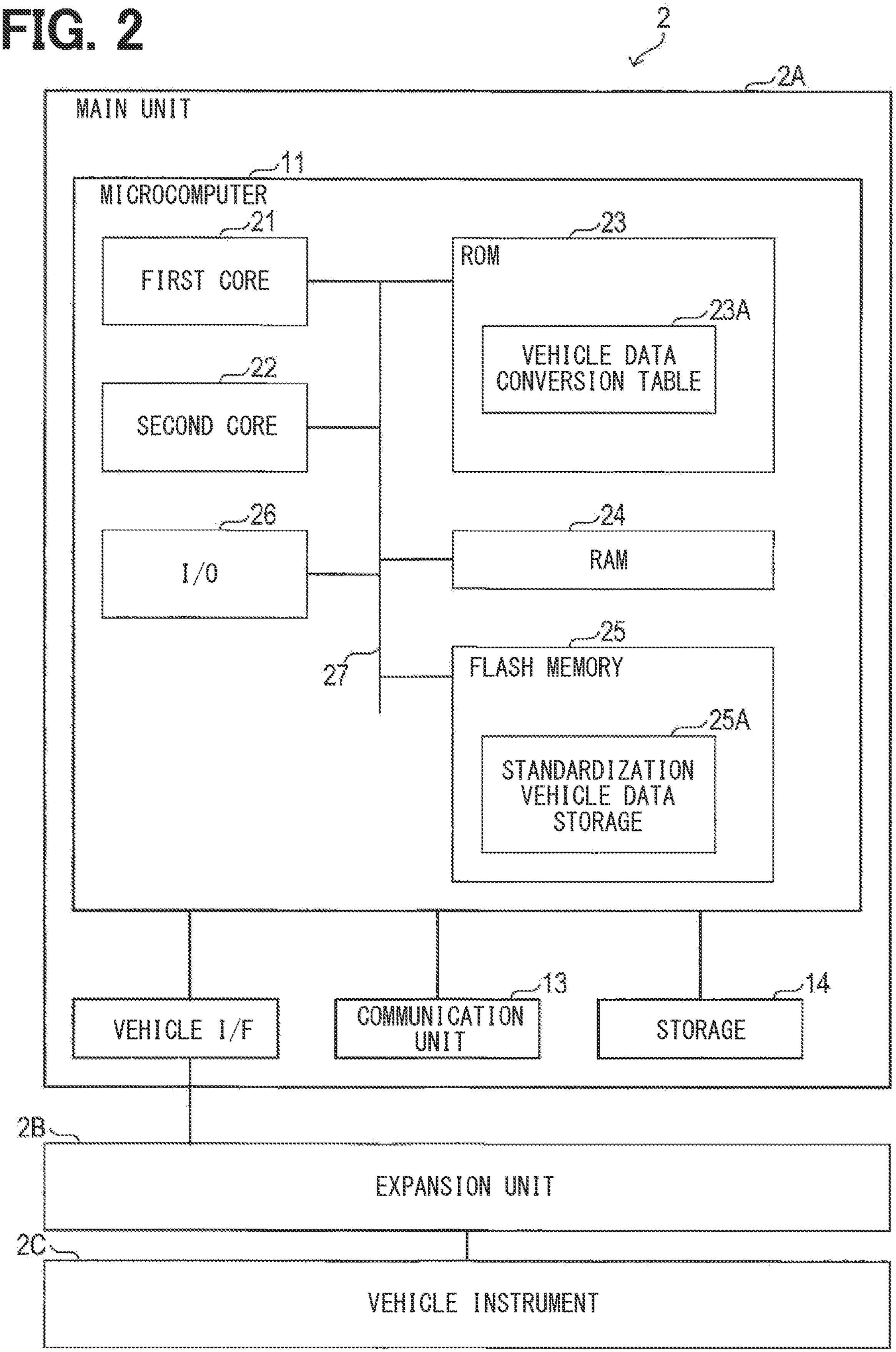
FIG. 2 is a block diagram showing a configuration of a data collection device.
Figure 3:
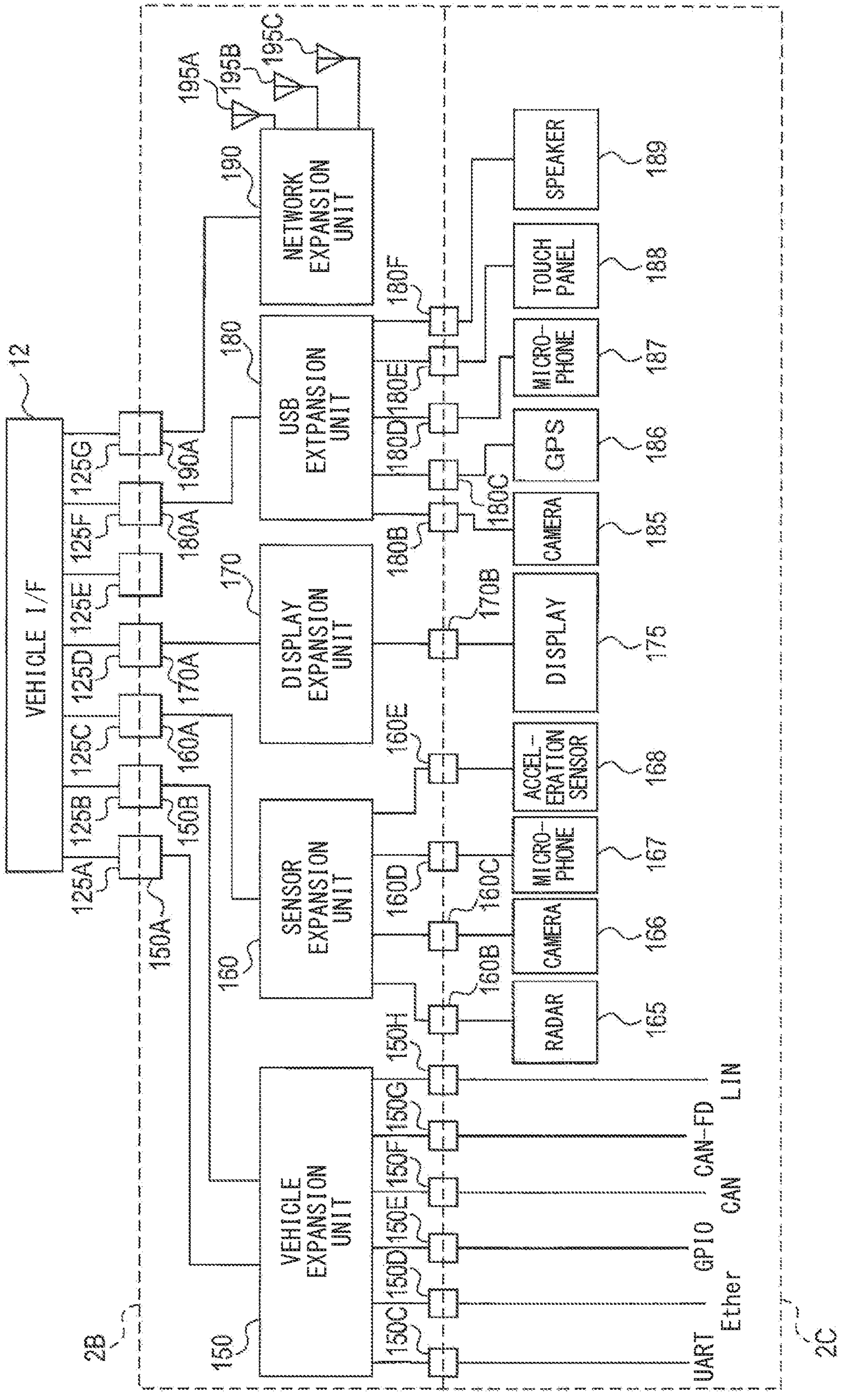
FIG. 3 is a block diagram showing a configuration of an expansion unit and a vehicle side device.

As shown in FIG. 2, the data collection device 2 includes the main body 2A that is the main body of an in-vehicle device, and an expansion unit 2B that is configured to be detachably attached to the main body 2A. Although one expansion unit 2B is illustrated in FIG. 2, as shown in FIG. 3, multiple expansion units 2B may be provided. The expansion unit 2B is configured to be electrically connectable to and disconnectable from the main body 2A mounted on a vehicle by using connectors 150A to 190A.

As shown in FIG. 2, the main body 2A includes a microcomputer 11, a vehicle interface (hereinafter, referred to as vehicle I/F) 12, a communication unit 13, and a storage unit 14.

The microcomputer 11 includes a first core 21, a second core 22, a ROM 23, a RAM 24, a flash memory 25, an input/output unit 26, and a bus 27.

Various functions of the microcomputer 11 are implemented by the first core 21 and the second core 22 executing programs stored in a non-transient physical recording medium. In this example, the ROM 23 corresponds to the non-transient physical recording medium that stores a program. Further, a method corresponding to the program is performed by executing the program. Some or all of the functions executed by the first core 21 and the second core 22 may be configured in hardware using one or more ICs or the like.

The flash memory 25 is a rewritable nonvolatile memory. The flash memory 25 includes a standardization vehicle data storage 25A that stores standardized vehicle data to be described later.

The input/output unit 26 is a circuit for inputting/outputting data between the outside of the microcomputer 11 and the first core 21 and second core 22.

The bus 27 connects the first core 21, the second core 22, the ROM 23, the RAM 24, the flash memory 25, and the input/output unit 26 to each other so that data can be input and output.

The communication unit 13 performs data communication with the management center 3 via the wide area wireless communication network NW.

The storage unit 14 is a storage device for storing various data.

The vehicle I/F 12 is an input/output circuit for inputting and outputting signals between an electronic control device, a sensor, and the like mounted on the vehicle. The vehicle I/F 12 includes a power supply voltage input port, a general-purpose input/output port, a CAN communication port, an Ethernet communication port, and the like. The CAN communication port is a port for transmitting and receiving data according to the CAN communication protocol. The Ethernet communication port is a port for transmitting and receiving data based on an Ethernet communication protocol. CAN is an abbreviation for Controller Area Network. CAN is a registered trademark. Ethernet is a registered trademark.

The expansion unit 2B is connected to the CAN communication port and the Ethernet communication port as described later, and other electronic control devices mounted on the vehicle are connected via the expansion unit 2B. Accordingly, the main body 2A of the data collection device 2 can transmit and receive communication frames with other electronic control devices.

As shown in FIG. 3, each port included in the vehicle I/F 12 includes multiple connectors 125A to 125G connectable to the expansion unit 2B. Different expansion units 2B can be connected to the multiple connectors 125A to 125G, respectively. Further, the vehicle I/F 12 is configured to communicate by using a communication protocol set in advance for each of the connectors 125A to 125G.

The expansion unit 2B has a function of expanding or enhancing the functions and performance of the main body 2A. For example, the expansion unit 2B has a function that the main body 2A does not have, or a function of increasing the speed by freeing up the resources of the main body 2A by taking on a part of the processing performed in the main body 2A.

The expansion unit 2B is electrically disposed between the vehicle I/F 12 and a vehicle side instrument 2C. The vehicle I/F 12 can acquire data from the vehicle side instrument 2C via the expansion unit 2B, and in particular can collect data to be transmitted to the management center 3 via the expansion unit 2B. Further, the vehicle I/F 12 can transmit data to the vehicle side instrument 2C via the expansion unit 2B.

Specifically, as shown in FIG. 3, the data collection device 2 includes a vehicle expansion unit 150, a sensor expansion unit 160, a display expansion unit 170, a USB expansion unit 180, and a network expansion unit 190 as the expansion units 2B. Although the example shown in FIG. 3 includes many expansion units 150 to 190, the number and type of expansion units 150 to 190 can be set arbitrarily depending on the type and grade of the vehicle. Therefore, the main body 2A can function as the data collection device 2 even without the expansion unit 2B.

The vehicle expansion unit 150 includes the in-vehicle device side connectors 150A and 150B and the device side connectors 150C to 150H. The in-vehicle device side connectors 150A and 150B are connectors connected to the main body 2A, and the device side connectors 150C to 150H are connectors connected to the vehicle side instrument 2C. The vehicle expansion unit 150 communicates with other electronic control devices disposed in the vehicle via the device side connectors 150C to 150H, and inputs data obtained from the vehicle side instrument 2C located inside the vehicle. That is, the vehicle expansion unit 150 takes vehicle data for controlling the vehicle as input data.

Further, the vehicle expansion unit 150 has a function of transmitting and receiving data to and from the main body 2A via the in-vehicle device side connectors 150A and 150B. The in-vehicle device side connector 150A is a connector compatible with the Ethernet communication protocol, and is configured to be connectable with the vehicle I/F 12 side connector 125A. The in-vehicle device side connector 150B is a connector compatible with CAN, GPIO, and UART communication protocols, and is configured to be connectable to the vehicle I/F 12 side connector 125B.

GPIO means a general-purpose 10 port and is an abbreviation for General Purpose Input/Output. Further, UART is an abbreviation for Universal Asynchronous Receiver/Transmitter.

The device side connector 150C is a connector compatible with the UART communication protocol. The device side connector 150D is a connector compatible with the Ethernet communication protocol. The device side connector 150E is a connector compatible with the GPIO communication protocol. The device side connector 150F is a connector compatible with the CAN communication protocol. The device side connector 150G is a connector compatible with the CAN FD communication protocol. The device side connector 150H is a connector compatible with the LIN communication protocol. These device side connectors 150C to 150H may be housed in one connector case.

CAN FD is an abbreviation for CAN with Flexible Data Rate. Further, LIN is an abbreviation for Local Interconnect Network.

The sensor expansion unit 160 includes an in-vehicle device side connector 160A and device side connectors 160B to 160E. The sensor expansion unit 160 is connected to the vehicle I/F 12 via the in-vehicle device side connector 160A. The sensor expansion unit 160 is connected to a radar 165, a camera 166, a microphone 167, and an acceleration sensor 168 via the device side connectors 160B to 160E. The device side connector 160A is a connector compatible with communication protocols such as UART, Ethernet, and USB. The sensor expansion unit 160 takes sensing data for detecting an object or event as input data.

The in-vehicle device side connector 160A of the sensor expansion unit 160 is a connector compatible with UART and Ethernet communication protocols, and is configured to be connectable with the vehicle I/F 12 side connector 125C.

The sensor expansion unit 160 acquires data obtained from the radar 165, the camera 166, the microphone 167, and the acceleration sensor 168 via the device side connectors 160B to 160E, and performs predetermined processing. The processed data is then transmitted to the vehicle I/F 12 via the in-vehicle device side connectors 150A and 150B.

The display expansion unit 170 includes an in-vehicle device side connector 170A and a device side connector 170B. The display expansion unit 170 is connected to the vehicle I/F 12 via the in-vehicle device side connector 170A. The display expansion unit 170 is connected to a display 175 via the device side connector 170B. The display expansion unit 170 takes display data such as video as input data.

The in-vehicle device side connector 170A is compatible with, for example, LVDS format video data, and the device side connector 170B is compatible with, for example, HDMI format video data. HDMI is a registered trademark. The display expansion unit 170 converts the format of video data sent from the vehicle I/F 12 and outputs the data to display 175. In other words, the expansion unit 2B may have a function of converting data or a function of converting a communication protocol, like the display expansion unit 170.

The USB expansion unit 180 includes an in-vehicle device side connector 180A and device side connectors 180B to 180F. The USB expansion unit 180 is connected to the vehicle I/F 12 via the in-vehicle device side connector 180A. The USB expansion unit 180 is connected to a camera 185, a GPS antenna 186, a microphone 187, a touch panel 188, and a speaker 189 via the device side connectors 180B to 180F. The USB expansion unit 180 takes USB standard data as input data.

The in-vehicle device side connector 180A of the USB expansion unit 180 is a connector compatible with the communication protocol of the USB standard, and is configured to be connectable with a connector 125E or 125F on the vehicle I/F 12 side. In the example of FIG. 3, the in-vehicle device side connector 180A is connected to the connector 125F, and the connector 125E is in an unconnected state of not being connected to any of the expansion units 150 to 190.

Other expansion units having a USB standard connector can be connected to the connector 125E.

The USB expansion unit 180 acquires data obtained from the camera 185, the GPS antenna 186, the microphone 187, the touch panel 188, and the speaker 189 via the device side connectors 180B to 180F, and performs predetermined processing. The processed data is then transmitted to the vehicle I/F 12 via the vehicle side device in-vehicle device side connector 180A.

The network expansion unit 190 includes the in-vehicle device side connector 190A, a Bluetooth antenna 195A, a WiFi antenna 195B, and a cellular antenna 195C. Bluetooth and WiFi are registered trademarks. The in-vehicle device side connector 190A is a connector compatible with peripheral component interconnect express (PCI Express), USB, and UART communication protocols. Multiple output lines included in the in-vehicle device side connector 190A may be provided so as to correspond to data received from each of the antennas 195A, 195B, and 195C. Further, one output line may be provided for outputting data received from each of the antennas 195A, 195B, and 195C.

The network expansion unit 190 is configured to communicate with a predetermined server or the like located outside the vehicle, and uses data obtained from a communication instrument outside the vehicle as input data. The network expansion unit 190 performs predetermined processing on input data, and transmits the processed data to the vehicle I/F 12 via the in-vehicle device side connector 190A.

Figure 4:
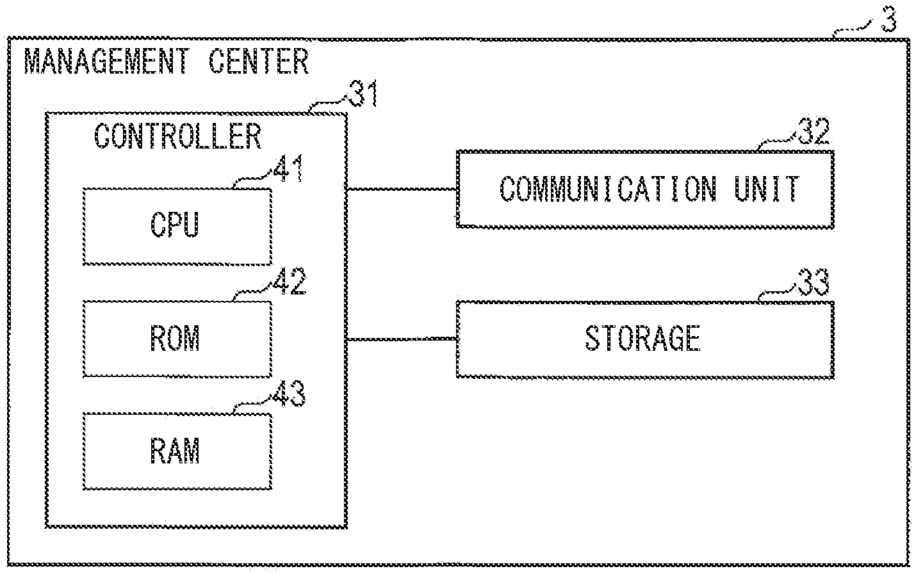
FIG. 4 is a block diagram showing a configuration of a management center.

The management center 3 includes a controller 31, a communication unit 32, and a storage unit 33, as shown in FIG. 4.

The controller 31 is an electronic control device mainly composed of a microcomputer including a CPU 41, a ROM 42, a RAM 43, and the like. Various functions of the microcomputer are implemented by the CPU 41 executing programs stored in a non-transient physical recording medium. In this example, the ROM 42 corresponds to the non-transient physical storage medium in which the programs are stored. Further, a method corresponding to the program is performed by executing the program. Some or all of the functions executed by the CPU 41 may be configured in hardware using one or more ICs. Further, the number of the microcomputers constituting the controller 31 may be one or more.

The communication unit 32 performs data communication with the multiple data collection devices 2 and the service provision server 4 via the wide area wireless communication network NW.

The storage unit 33 is a storage device for storing various data.

Figure 5:
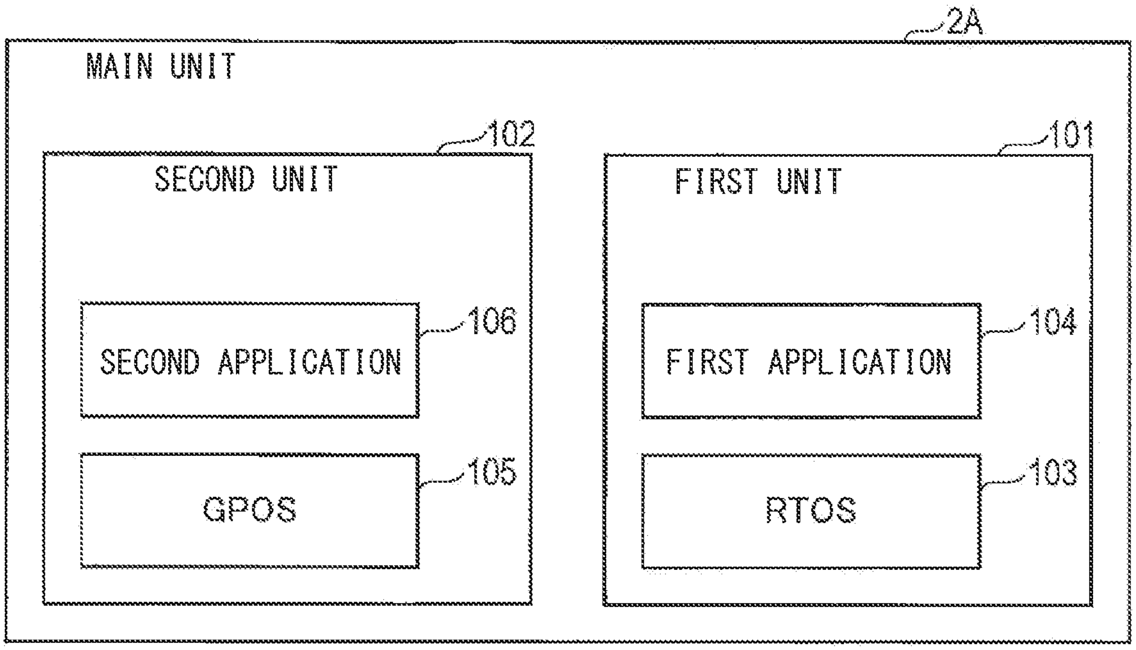
FIG. 5 is a functional block diagram showing a functional configuration of the data collection device.

The main body 2A of the data collection device 2 includes a first unit 101 as a functional block implemented by the first core 21 executing a program stored in the ROM 23, as shown in FIG. 5. The main body 2A includes a second unit 102 as a functional block implemented by the second core 22 executing a program stored in the ROM 23.

The first unit 101 includes a real-time operating system (hereinafter, referred to as RTOS) 103 and a first application 104.

The first application 104 executes various kinds of processing for controlling the vehicle. The first application 104 is configured to access the standardization vehicle data storage 25A of the flash memory 25 and refer to the standardized vehicle data in order to execute various kinds of processing for controlling the vehicle.

The RTOS 103 manages the first application 104 so that real-time processing by the first application 104 can be ensured. The second unit 102 includes a general purpose operating system (hereinafter, referred to as GPOS) 105 and a second application 106.

The second application 106 executes processing related to the service provided by the service provision server 4. The second application 106 is configured to access the standardization vehicle data storage 25A of the flash memory 25 and refer to the standardized vehicle data in order to execute service-related processing.

The GPOS 105 is basic software installed in the data collection device 2 to operate various applications, and manages the second application 106.

Figure 6:
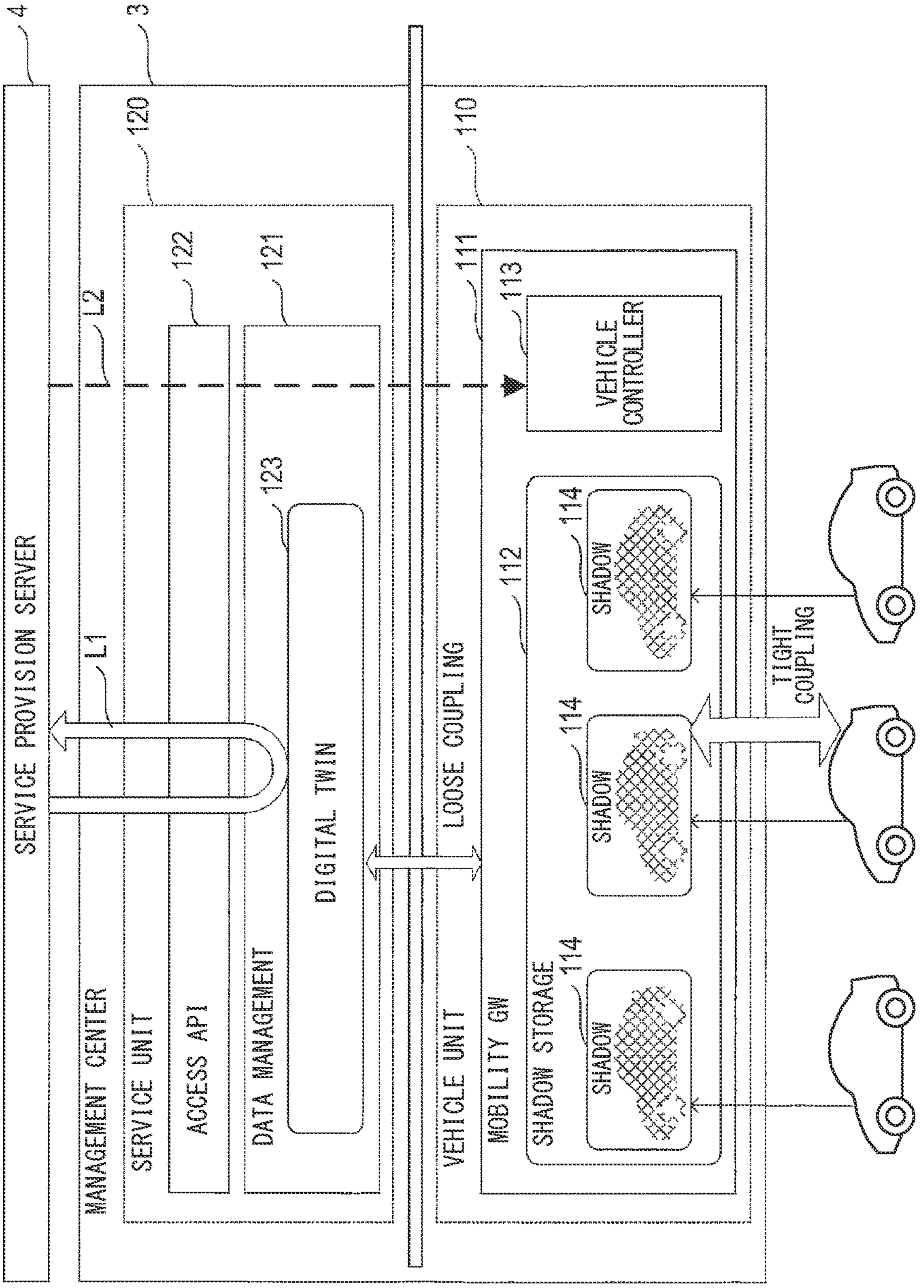
FIG. 6 is a functional block diagram showing a functional configuration of the management center.

The management center 3 includes a vehicle side unit 110 and a service side unit 120 as functional blocks implemented by the CPU 41 executing a program stored in the ROM 42, as shown in FIG. 6.

The method of realizing these elements constituting the management center 3 is not limited to software, and some or all of the elements may be implemented by using one or multiple pieces of hardware. For example, when the above function is implemented by an electronic circuit that is hardware, the electronic circuit may be implemented by a digital circuit including a large number of logic circuits, an analog circuit, or a combination thereof.

The vehicle side unit 110 manages access to the vehicle and data received from the vehicle. The vehicle side unit 110 includes a mobility gateway (hereinafter, referred to as mobility GW) 111. The mobility GW 111 has a function of relaying a request for access to a vehicle to the vehicle, as well as a function of managing data received from the vehicle.

The mobility GW 111 includes a shadow storage unit 112 and a vehicle controller 113. The shadow storage unit 112 stores a shadow 114 that stores data for each vehicle on which the data collection device 2 is mounted. The shadow 114 shows a group of vehicle data for a certain vehicle. The vehicle controller 113 has a function of controlling a vehicle on which the data collection device 2 is mounted, based on instructions from the service provision server 4.

The service side unit 120 receives requests from the service providing server and provides vehicle data. The service side unit 120 includes a data management unit 121 and an access API 122. API is an abbreviation for Application Programming Interface.

The data management unit 121 has a function of managing a digital twin 123, which is a virtual space for providing vehicle access independent of changes in the connection state of the vehicle. The data management unit 121 manages data required for accessing vehicle data managed by the vehicle side unit 110. The access API 122 is a standard interface for the service provision server 4 to access the mobility GW 111 and the data management unit 121. The access API 122 provides the service provision server 4 with an API for accessing the vehicle and acquiring vehicle data.

(1-3. Functions of Main Body and Expansion Unit)

Next, the processing executed by the main body 2A and the expansion unit 2B will be described. Regarding the expansion unit 2B, the vehicle expansion unit 150 will be described as a representative of the expansion unit 2B. Since the other expansion units 160 to 190 have generally similar configurations and functions, only the differences will be described.

Figure 7:
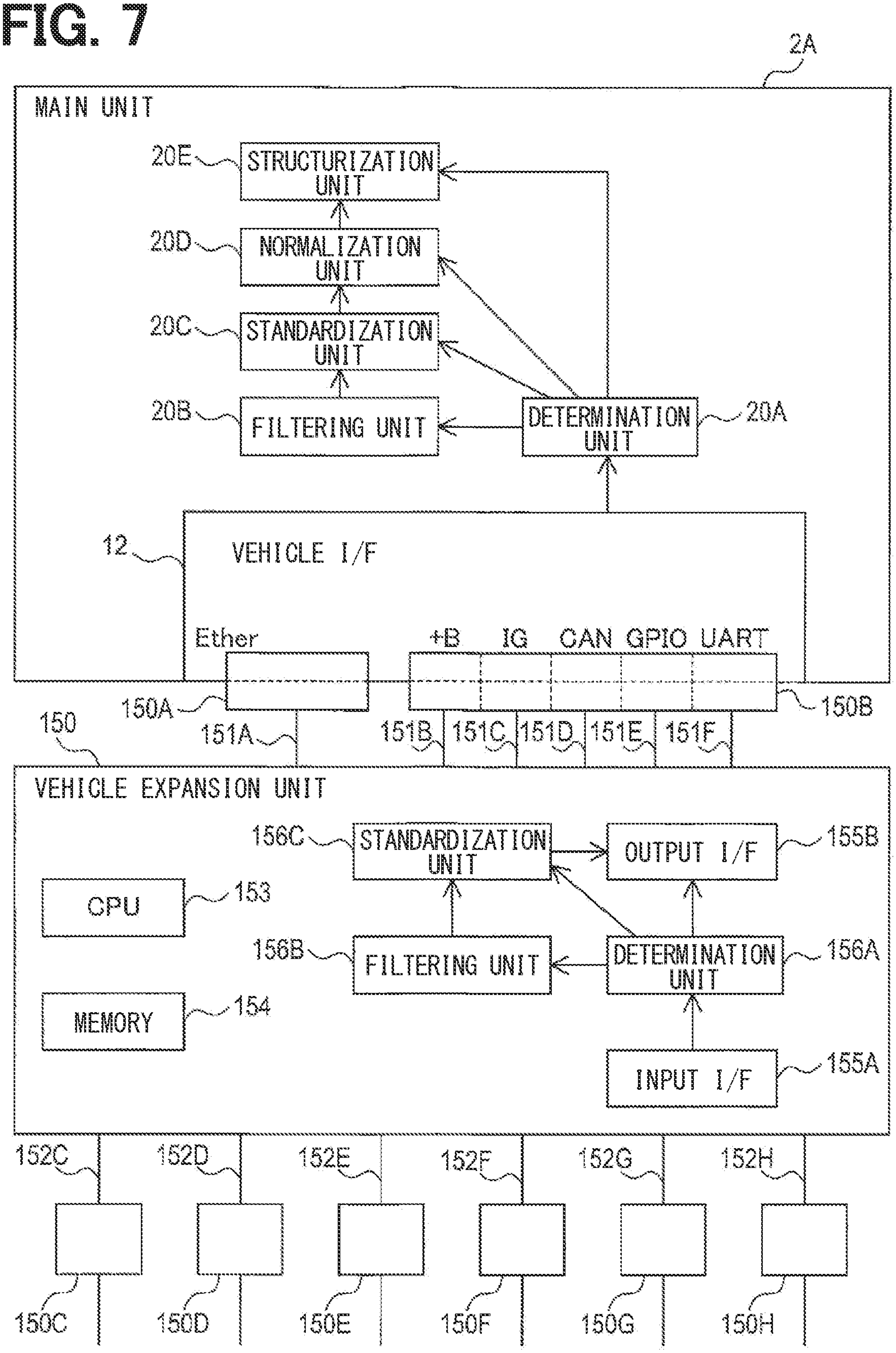
FIG. 7 is a functional block diagram showing a functional configuration of a main body and a vehicle expansion unit.

The vehicle expansion unit 150, as shown in FIG. 7, is an electronic control device mainly composed of a microcomputer including a CPU 153 and a memory 154 such as a ROM and a RAM. Various functions of the microcomputer are implemented by the CPU 153 executing programs stored in a non-transient physical recording medium. In this example, the memory 154 corresponds to a non-transient physical recording medium that stores a program. Further, a method corresponding to the program is performed by executing the program. Some or all of the functions executed by the CPU 153 may be configured in hardware using one or more ICs. Further, the number of microcomputers provided in the vehicle expansion unit 150 may be one or more.

The functions executed by the CPU 153 include an input I/F 155A, an output I/F 155B, a determination unit 156A, a filtering unit 156B, and a standardization unit 156C.

The vehicle expansion unit 150 includes multiple input lines 152C to 152H, multiple output lines 151A to 151F, and at least one of the connectors 150A to 190A.

The input lines 152C to 152H are provided for each communication protocol of data to be handled, and data is input thereto. In the present embodiment, even when multiple wirings are required for one communication protocol, the multiple f wirings will be referred to as one input line. The same applies to the output lines.

Here, the input lines 152C to 152H are wirings connected to the device side connectors 150C to 150H. In particular, the input line 152C is a wiring compatible with UART. Further, the input line 152D is a wiring compatible with Ethernet. Further, the input line 152E is a wiring compatible with GPIO. Further, the input line 152F is a wiring compatible with CAN. Further, the input line 152G is a wiring compatible with CAN FD. Further, the input line 152H is a wiring compatible with LIN.

The output lines 151A to 151F are configured as a power line or communication line provided for each communication protocol of output data. Data is output from the communication line. Here, the output line 151A is a wiring connected to the connector 150A. In particular, the input line 152D is a wiring compatible with Ethernet, and is connected to the vehicle I/F 12 through the connector 150A. Here, the input data on the input line 152D is output to the output line 151A without being processed by the vehicle expansion unit 150.

The output lines 151B to 151F are wirings that are connected together to the in-vehicle device side connector 150B. The output line 151B is a wiring for battery power supply. The output line 151C is a wiring for ignition power supply. The output line 151D is a communication line for communicating with CAN. The output line 151E is a communication line for communicating with GPIO. The output line 151F is a communication line for communicating with UART. The in-vehicle device side connector 150B may be provided for each of the output lines 151A to 151F. Further, any one of the output lines 151B to 151F may be unconnected.

Here, in the example shown in FIG. 7, the vehicle expansion unit 150 is connected to the vehicle I/F 12 through both the connectors 150A and 150B. As a result, the number of the input lines 152C to 152H through which data is transmitted is set smaller than the number of the output lines 151A, 151D to 151F through which data is transmitted. The vehicle expansion unit 150 may be connected to the vehicle I/F 12 through only one of the connectors 150A and 150B. Further, the vehicle expansion unit 150 may include only one of the connectors 150A and 150B.

Here, for example, when different types of image data such as JPEG and GIF are input to the expansion unit 2B such as the vehicle expansion unit 150, two input lines may be disposed for each protocol or data type, for example, one for JPEG and one for GIF. Even data using the same communication protocol does not need to be transmitted over one communication line. For example, the input lines may be separated for each type of data, and for example, two lines may be disposed, one USB connection line for JPEG and one USB connection line for GIF. On the other hand, when the expansion unit 2B performs image recognition on JPEG and GIF image data and forms the data into a standard format for target object information, since the data to be output is only target object information, the number of output lines can be one. In other words, the number of output lines is smaller than the number of input lines for the same type of input data. Here, the communication protocol used with this one output line is arbitrary.

Data input from one or multiple input lines using different communication protocols may be output from one output line. For example, if there are a CAN input line and a CAN FD input line, data received through the CAN FD input line may be converted into a CAN format and output from a CAN output line. In this case, CAN input data and CAN FD input data can be output from the same CAN output line, and the number of output lines is smaller than the number of input lines.

On the other hand, when MPEG image data is input to the expansion unit 2B, only one input line for MPEG can be disposed. In the expansion unit 2B, this input line can be branched into two lines. One of the output lines can be used to output the MPEG image data itself from the output line. The other one output line can be used to perform image recognition in the expansion unit 2B and output the standard format of target object information. In other words, there are more output lines than input lines for the same type of input data.

Data input from one communication protocol may be branched and output from two output lines. For example, if there is a CAN input line, one of the output lines can be used to output the CAN input data itself. The other one output line can be used to normalize input data in the expansion unit 2B and output the normalized data.

The input I/F 155A acquires data input from the input lines 152C to 152H and stores the in the memory 154. The output I/F 155B provides the vehicle I/F 12 with the data that has been instructed to be output.

Here, as shown in FIG. 7, the main body 2A of the data collection device 2 includes a determination unit 20A, a filtering unit 20B, a standardization unit 20C, a normalization unit 20D, and a structurization unit 20E as functions executed by the first unit 101 or the second unit 102. These functions may be performed by either the first unit 101 or the second unit 102.

The determination unit 156A of the vehicle expansion unit 150, the filtering unit 156B, and standardization unit 156C are configured to perform predetermined processing on input data and output the output data based on the input data from the output lines 151A to 151F. The output data may be processed data by the filtering unit 156B or the like, or may be the input data itself.

Since the determination unit 20A, the filtering unit 20B, and the standardization unit 20C included in the main body 2A have the same functions as the determination unit 156A, the filtering unit 156B, and the standardization unit 156C included in the vehicle expansion unit 150, the functions will be collectively described below.

(1-3-1. Determination Unit)

When data is received from the vehicle I/F 12 or the input I/F 155A, the determination units 20A and 156A recognize the communication protocol of the data based on the communication port that has received the data, that is, the connectors 150C to 150H. Specifically, when data is received through a CAN communication port (for example, input line 152F), the determination units 20A and 156A recognize that the communication protocol of the received data is CAN. Further, when data is received through an Ethernet communication port (for example, input line 152D), the determination units 20A and 156A recognize that the communication protocol of the received data is Ethernet.

In particular, the determination unit 156A of the vehicle expansion unit 150 determines the capabilities of the main body 2A, that is, the processing that the main body 2A can execute, based on the communication protocol, the types of the connectors 150A to 190A, and the like. This is to set whether the processing should be executed by the vehicle expansion unit 150 or the main body 2A depending on whether the main body 2A has sufficient capabilities.

When it is determined that the main body 2A has the preset capability, the determination unit 156A of the vehicle expansion unit 150 transfers the received data as it is to the output I/F 155B so as to transmit the data to the main body 2A, without performing thinning, protocol conversion, and the like on the data.

More specifically, the determination unit 156A of the vehicle expansion unit 150 determines what kind of processing is to be performed on the input data based on a filtering table 8 as shown in FIG. 8. When data is received from a communication protocol other than CAN, in other words, from the connectors 150C to 150E and 150G to 150H having communication ports other than CAN, the vehicle expansion unit 150 performs processing by the filtering unit 156B and the standardization unit 156C, which will be described later. However, when data is received from the CAN communication protocol, in other words, from the connector 150F having a CAN communication port, the vehicle expansion unit 150 does not perform processing by the filtering unit 156B and the standardization unit 156C, which will be described later.

Figure 9:
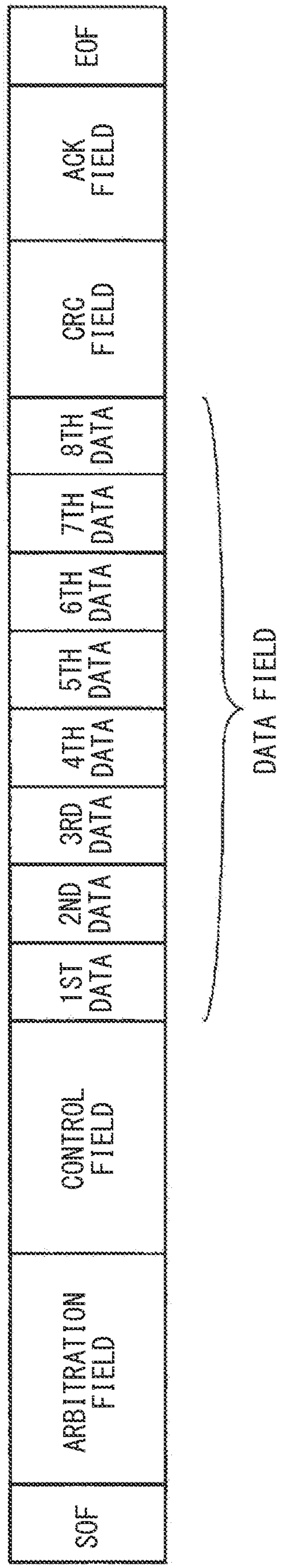
FIG. 9 is a diagram showing a configuration of a CAN frame.

As shown in FIG. 9, a CAN frame is composed of a start of frame, an arbitration field, a control field, a data field, a CRC field, an ACK field, and an end of frame. The arbitration field is composed of an 11-bit or 29-bit identifier (that is, ID) and a 1-bit RTR bit.

Further, the 11-bit identifier used in CAN communication is called CAN ID. The CAN ID is set in advance based on the content of data included in the CAN frame, the source of the CAN frame, the destination of the CAN frame, and the like.

The data field is composed of first data, second data, third data, fourth data, fifth data, sixth data, seventh data, and eighth data, each of 8 bits (that is, 1 byte). Hereinafter, each of the first to eighth data of the data field will also be referred to as CAN data.

For example, the expansion units 2B other than the vehicle expansion unit 150 process as follows. When data is received from a UART communication protocol, in other words, from a connector having a UART communication port, the sensor expansion unit 160 performs processing by the filtering unit 156B and the standardization unit 156C, which will be described later. However, when data is received from an Ethernet communication protocol, in other words, from a connector having an Ethernet communication port, sensor expansion unit 160 does not perform processing by the filtering unit 156B and the standardization unit 156C, which will be described later. In other words, data input from the Ethernet input line is output as it is from the output line. In addition, in the sensor expansion unit 160, even when data is received from the UART communication protocol, if the type of image is a preset type, processing by the filtering unit 156B and the standardization unit 156C, which will be described later, may be omitted. In other words, the configuration may be such that a specific type of image data input from the input line of the UART is output as it is from the output line.

Further, the display expansion unit 170 and the USB expansion unit 180 do not perform processing by the filtering unit 156B and the standardization unit 156C, which will be described later, regardless of the type of data handled. In other words, data input from the input line is output as it is from the output line.

Further, the network expansion unit 190 performs processing by the filtering unit 156B and the standardization unit 156C, which will be described later, regardless of the type of data handled.

Data for which it is determined that the processing by the filtering unit 156B and the standardization unit 156C is not performed is sent to the output I/F 155B.

Even when any expansion unit 2B is configured such that input data is output as it is from the output line, the input line and the output line are not directly connected. The input line and the output line are connected via the microcomputer provided in the expansion unit 2B, and when the input data is output as it is from the output line, the microcomputer outputs the data received from the input line to the output line without processing (changing) the data.

The determination unit 20A of the main body 2A recognizes what kind of processing should be performed in the expansion unit 2B depending on the type of data. For example, the determination unit 20A sets the filtering unit 20B and the standardization unit 20C of the main body 2A to perform processing on data that has not been processed by the filtering unit 156B and the standardization unit 156C of the expansion unit 2B. In other words, in the configuration of the present embodiment, each processing by the filtering units 20B and 156B, the standardization units 20C and 156C, a normalization unit 20D, and the structurization unit 20E is performed in either the main body 2A or the expansion unit 2B.

(1-3-2. Filtering Unit)

The filtering units 20B and 156B perform filtering on input data. Here, filtering in the present embodiment refers to processing input data so that the amount of data is further reduced.

Specifically, as shown in FIG. 8, the filtering unit 156B of the vehicle expansion unit 150 extracts only data corresponding to the required type specified by the CAN ID from data received by using a communication protocol other than CAN. That is, even when a communication protocol other than CAN is used, since a communication frame corresponding to a CAN frame is input as input data, a CAN frame corresponding that corresponds to the required type specified by CAN ID is extracted. For example, vehicle data specified by CAN ID, such as vehicle speed, position information, and engine rotation speed, is transmitted by using a communication protocol such as CAN FD or Ethernet. The filtering unit 156B extracts only data (corresponding to a CAN frame) corresponding to a required CAN ID from among the vehicle data specified by these CAN IDs. When data is received by using the CAN communication protocol, the vehicle expansion unit 150 does not perform filtering. In this case, since CAN data has already been received, conversion into CAN data by the standardization unit 156C is not performed. However, the filtering unit 156B may perform processing of extracting only a preset type of CAN data from the input data.

When data is received by using the UART communication protocol, the filtering unit of the sensor expansion unit 160 (hereinafter, also referred to as sensor expansion unit 160) performs processing set depending on the type of data. When image data and video data are received, the sensor expansion unit 160 performs image recognition based on the input data, and extracts target object information as a recognition result. Specifically, for example, edges that are the boundaries of brightness on an image are extracted from binary data of only 0 and 1, and the shape and size of the edges determine whether the object in the image is a person, object, vehicle, sign, or the like. The sensor expansion unit 160 may only perform conversion to lower the resolution of the image, for example, conversion to reduce the number of pixels per frame.

When audio data is received, the sensor expansion unit 160 performs audio recognition based on the input data and extracts text data as a recognition result. The sensor expansion unit 160 may only perform conversion to lower the audio resolution, for example, the bit rate.

When sensing data is acquired from an obstacle sensor that detects obstacles around the vehicle, the sensor expansion unit 160 extracts the recognition result of the obstacle. The sensor expansion unit 160 recognizes at least the position of the obstacle (for example, the shape of the obstacle, the type of the obstacle, and the like) from the obstacle data. For example, when the obstacle sensor is the millimeter wave radar 165, sensing data (for example, raw data such as reflected waves) can be acquired and recognize a target object (for example, the coordinates of the object can be recognized).

The filtering unit 156B of the network expansion unit 190 (hereinafter, also referred to as the network expansion unit 190) acquires device data obtained from a short distance device such as a smartphone connected via wireless communication such as Bluetooth or WiFi. The network expansion unit 190 extracts only device data obtained from a preset device (for example, the vehicle owner's smartphone) from the obtained device data. That is, when there are multiple devices that can be paired with the vehicle, the network expansion unit 190 relays only data obtained from the preset device and discards data obtained from other devices.

The network expansion unit 190 acquires cloud data obtained from a cloud server via a short distance device or a cellular line, and extracts only cloud data obtained from a preset cloud server from the obtained data. That is, when there are multiple cloud servers that can communicate with the vehicle, the network expansion unit 190 relays only data obtained from the preset cloud server, and discards data obtained from other cloud servers. The cloud server may include the management center 3. In other words, the cloud server may be a server different from the management center 3.

(1-3-3. Standardization Unit)

The standardization units 20C and 156C perform standardization, which is processing of converting the data processed by the filtering units 20B and 156B into data in a preset format. Standardization is also called formatting.

The standardization units 20C and 156C convert data into a format that can be handled by the main body 2A. In the present embodiment, the data processed by the filtering units 20B and 156B is converted into a data format conforming to a CAN frame. A data format conforming to a CAN frame is, for example, data in the same order as the CAN frame, and represents data obtained by removing the header, footer, and the like from the CAN frame.

The standardized data includes, for example, an ID indicating data type, data length information, actual data (that is, payload), and an error correction code, and each data has a common format of data, that is, a common data format. For example, target object information that is a result of recognition is stored in the payload. When the standardization unit 156C of the expansion unit 2B such as the vehicle expansion unit 150 completes standardization, the output I/F 155B sends the standardized data to the vehicle I/F 12.

The output to the output line 151D may be converted to a data format conforming to the CAN frame, the output to the output line 151E may be converted to the GPIO format, and the output to the output line 151F may be converted to a data format conforming to the UART format.

(1-3-4. Normalization Unit)

The normalization unit 20D and the structurization unit 20E, which will be described below, are functions provided in the main body 2A. The normalization unit 20D generates normalized data by normalizing the standardized data by using normalization information. Then, the normalization unit 20D uses the normalized data to perform semanticization, which is processing of converting the normalized data into data whose meaning can be understood without comparing the data with other data.

The normalization unit 20D performs processing by using normalization information and semantic information. A vehicle data conversion table 23A shown in FIG. 2 includes normalization information and semantic information. The normalization information is information for normalizing extracted data so that the same physical quantity has the same value regardless of the vehicle type and vehicle manufacturing company. The semantic information is information (for example, an arithmetic expression, a conversion table) for converting normalized data into meaningful data. Vehicle data before being normalized may be used. Semanticization includes newly generating information that was not present in the payload of the communication frame by using an arithmetic expression or the like.

As shown in FIG. 10, the normalization information includes setting items such as "CAN ID", "ECU", "position", "DLC", "unique label", "resolution", "offset", and "unit". "Unique label" and "ECU" are as described above. "Data type," "data size," and "data unit" indicate the type, size, and unit of the numerical value indicated by "data value".

"ECU" is identification information indicating the ECU that is the source of the CAN frame. For example, "ENG" indicates an engine ECU.

"Position" is information indicating the position (for example, bit position) of CAN data within the data field. "DLC" is information indicating a data length. DLC is an abbreviation for Data Length Code. In other words, data corresponding to "DLC" bits is extracted from the "position" of the data field.

"Unique label" is information indicating a control label. For example, "ETHA" indicates an intake air temperature, and "NE1" indicates an engine rotation speed. "Resolution" is information indicating a numerical value per bit. "Offset" indicates the offset amount of the numerical value of the data. "Unit" indicates the unit of the data.

Therefore, data corresponding to the "unique label" is extracted from the standard format data by using "CAN ID", "ECU", "position", "DLC", and "unique label". Further, the extracted data is converted into data expressed in "resolution", "offset", and "unit".

Further, as shown in FIG. 10, for example, the semantic information is a transformation expression that converts the "steering movement angle" whose control label is "SSA" into "steering angle" by subtracting the "steering zero point" whose control label is "SSAZ". Accordingly, the data representing the "steering movement angle" and the data representing the "steering zero point" are converted into data representing the "steering angle" which has the meaning of "the amount of steering from a reference position". "Unique label", "unit", and the like are assigned to the newly generated vehicle data through semanticization. In other words, the meaning of semantic data can be understood without comparing the data with other data.

(1-3-5. Structuring Unit)

The structurization unit 20E performs data structuring, which is processing of associating the semantic data with each hierarchical classification in advance. At this time, the structurization unit 20E arranges the semantic data in a hierarchy and stores the data in the flash memory 25. Specifically, the structurization unit 20E stores the converted data in the corresponding region of the standardization vehicle data storage 25A provided in the flash memory 25. As a result, the standardization vehicle data storage 25A stores standardized vehicle data configured by arranging the data in a hierarchy.

Figure 11:
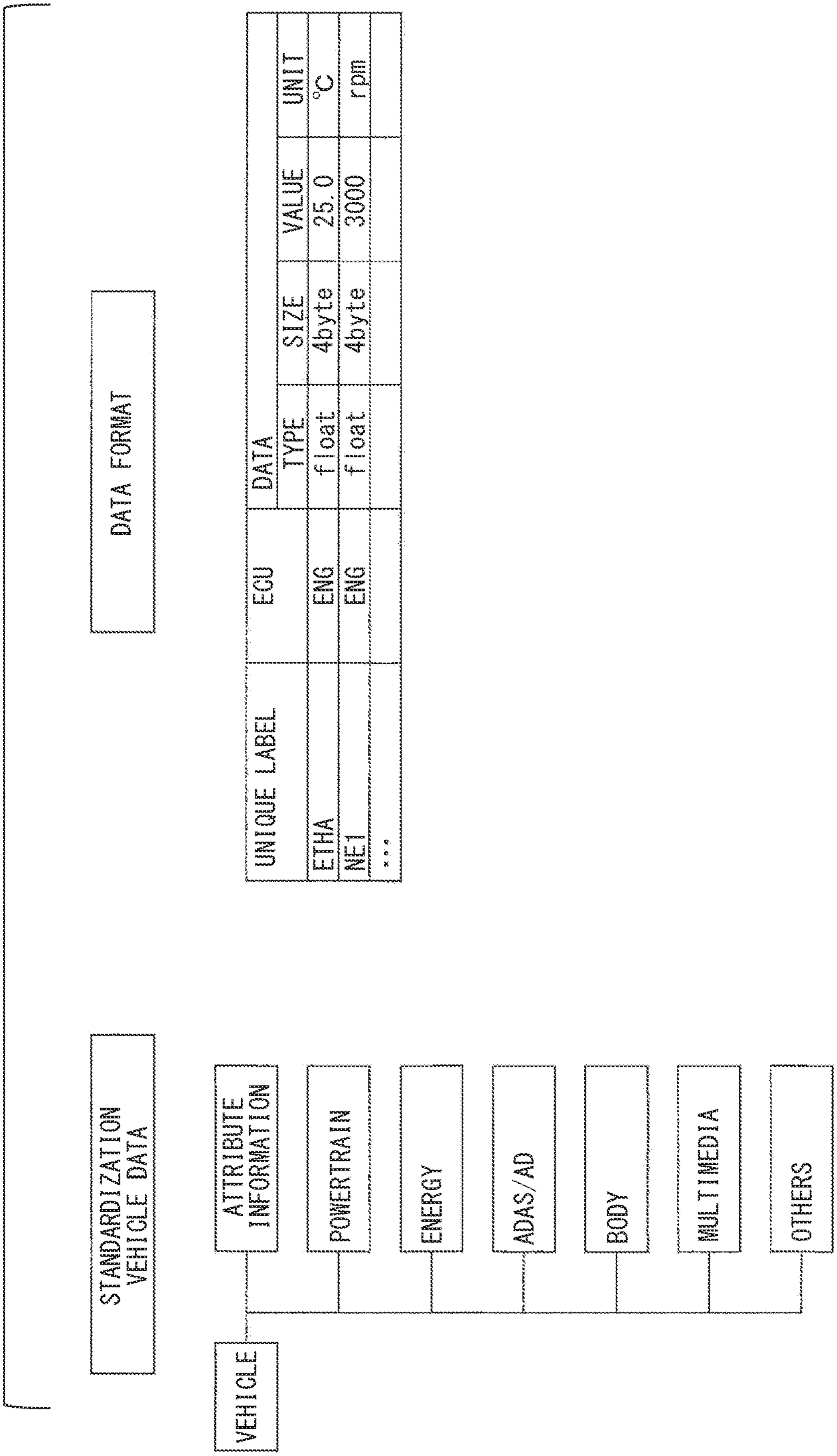
FIG. 11 is a diagram showing a first layer of standardized vehicle data and a data format.

The standardized vehicle data is created for each vehicle (that is, for each data collection device 2) and has multiple hierarchical structures. In the standardized vehicle data, one or more items are set for each of multiple layers. For example, as shown in FIG. 11, the standardized vehicle data includes "attribute information", "power train", "energy", "ADAS/AD", "body", "multimedia", and "other" as items set in the top first layer. ADAS is an abbreviation for Advanced Driver Assistance System. AD is an abbreviation for Autonomous Driving. These “attribute information”, “power train”, “energy”, and the like correspond to categories.

Each piece of data also includes items such as “unique label”, “ECU”, “data type”, “data size”, “data value”, and “data unit”.

Figure 12:
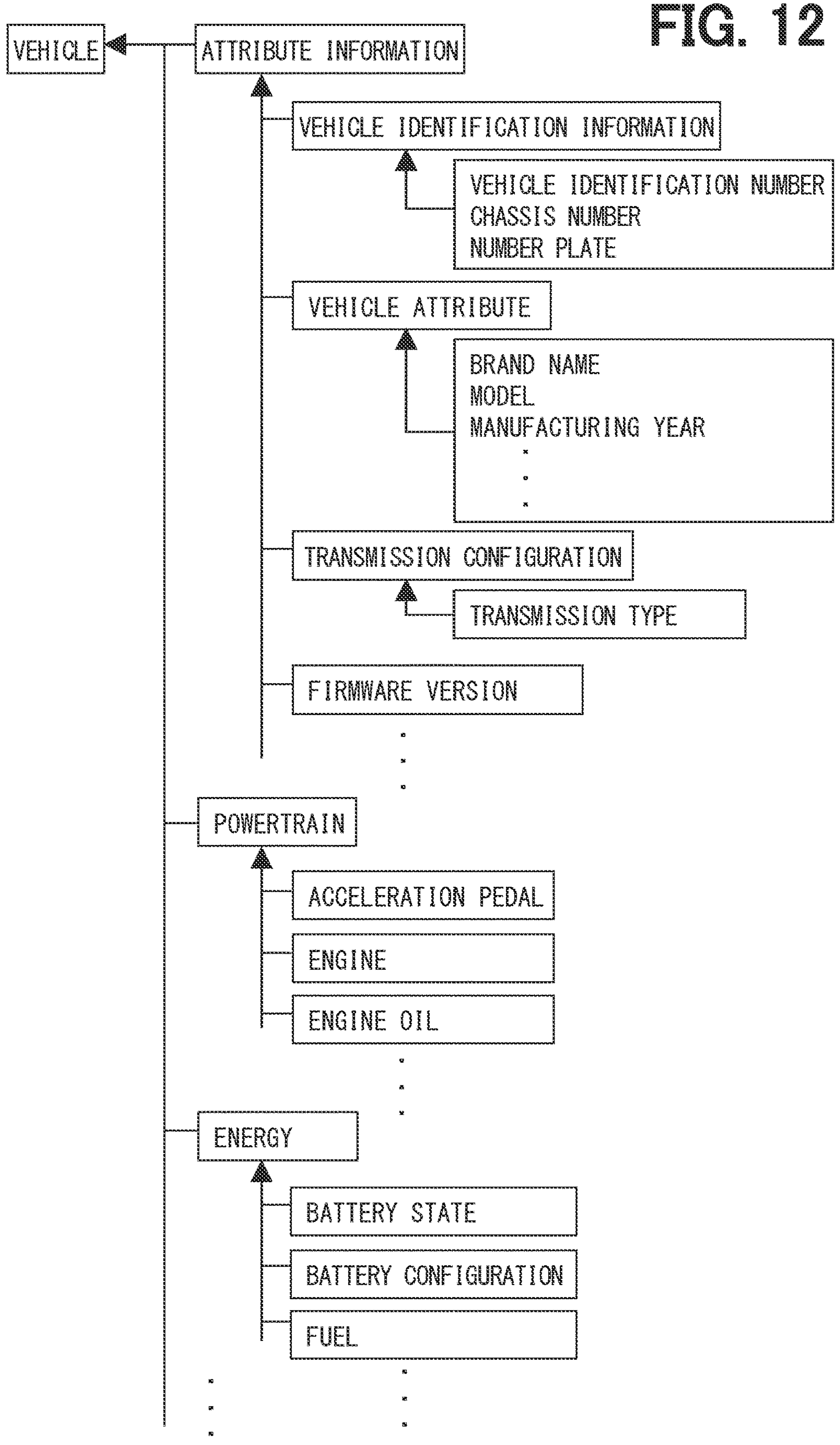
FIG. 12 is a diagram showing a configuration of the standardized vehicle data.

As shown in FIG. 12, the standardized vehicle data includes at least a second layer and a third layer in addition to a first layer. The second layer is the layer immediately below the first layer, and the third layer is the layer immediately below the second layer. The standardized vehicle data has a data structure that is a hierarchical structure.

For example, the first layer item “attribute information” includes second layer items such as “vehicle identification information”, “vehicle attribute”, “transmission configuration”, “firmware version”, and the like. “Vehicle identification information” is a category name indicating information that can uniquely identify a vehicle. “Vehicle attribute” is a category name indicating the type of vehicle. “Transmission information” is a category name indicating information regarding transmission. “Firmware version” is a category name indicating information regarding vehicle firmware.

Further, the first layer item “power train” is a category name indicating power train information, and the second layer items include “accelerator pedal”, “engine”, “engine oil”, and the like.

Further, the first layer item “energy” is a category name indicating energy information, and the second layer items include “battery status”, “battery configuration”, “fuel”, and the like.

Further, “vehicle identification information”, which is an item in the second layer, includes “vehicle identification number”, “vehicle body number”, and “license plate” as items in the third layer.

Further, “vehicle attribute”, which is an item in the second layer, includes “brand name”, “model”, “year of manufacture”, and the like as items in the third layer.

Further, the second layer item “transmission configuration” includes the third layer item “transmission type”.

For example, when the control label of the converted data is “vehicle identification information”, the second core 22 stores the converted data in a predetermined storage region. The predetermined storage region is, for example, a storage region where the first layer is “attribute information”, the second layer is “vehicle identification information”, and the third layer is “vehicle identification number” in the standardization vehicle data storage 25A.

(1-4. Data Creation Procedure)

Next, a procedure for the data collection device 2 to create standardized vehicle data will be described by using the sequence diagram shown in FIG. 13. This procedure is performed, for example, at predetermined intervals, and as a result, the data collection device 2 can periodically transmit data to the management center 3.

When the expansion unit 2B acquires data from the vehicle, as indicated by the arrow L11, the determination unit 156A of the expansion unit 2B makes various determinations, as indicated by the arrow L12. The various determinations include processing of determining whether to perform filtering based on the filtering table 8. A determination is also made here when no processing is required, such as with a CAN frame.

When the expansion unit 2B refers to the filtering table 8 and determines to perform filtering on the data, the filtering unit 156B performs the predetermined filtering set in the filtering table 8, as indicated by the arrow L13. When it is determined not to perform filtering on the data, the expansion unit 2B omits the filtering.

Subsequently, the standardization unit 156C of the expansion unit 2B converts the data into a standard format, as indicated by the arrow L14, and the output I/F 155B outputs the converted data to the main body 2A, as indicated by the arrow L15.

When the vehicle I/F 12 of the main body 2A acquires the data converted into the standard format from the expansion unit 2B, the determination unit 20A makes various determinations of the acquired data, as indicated by the arrow L21. Subsequently, the normalization unit 20D of the main body 2A performs normalization as indicated by the arrow L24. Further, the structurization unit 20E of the main body 2A structures the converted data to create structured vehicle data, as indicated by the arrow L25.

Thereafter, the main body 2A transmits the structured vehicle data to the management center 3, as indicated by the arrow L31.

Figure 14:
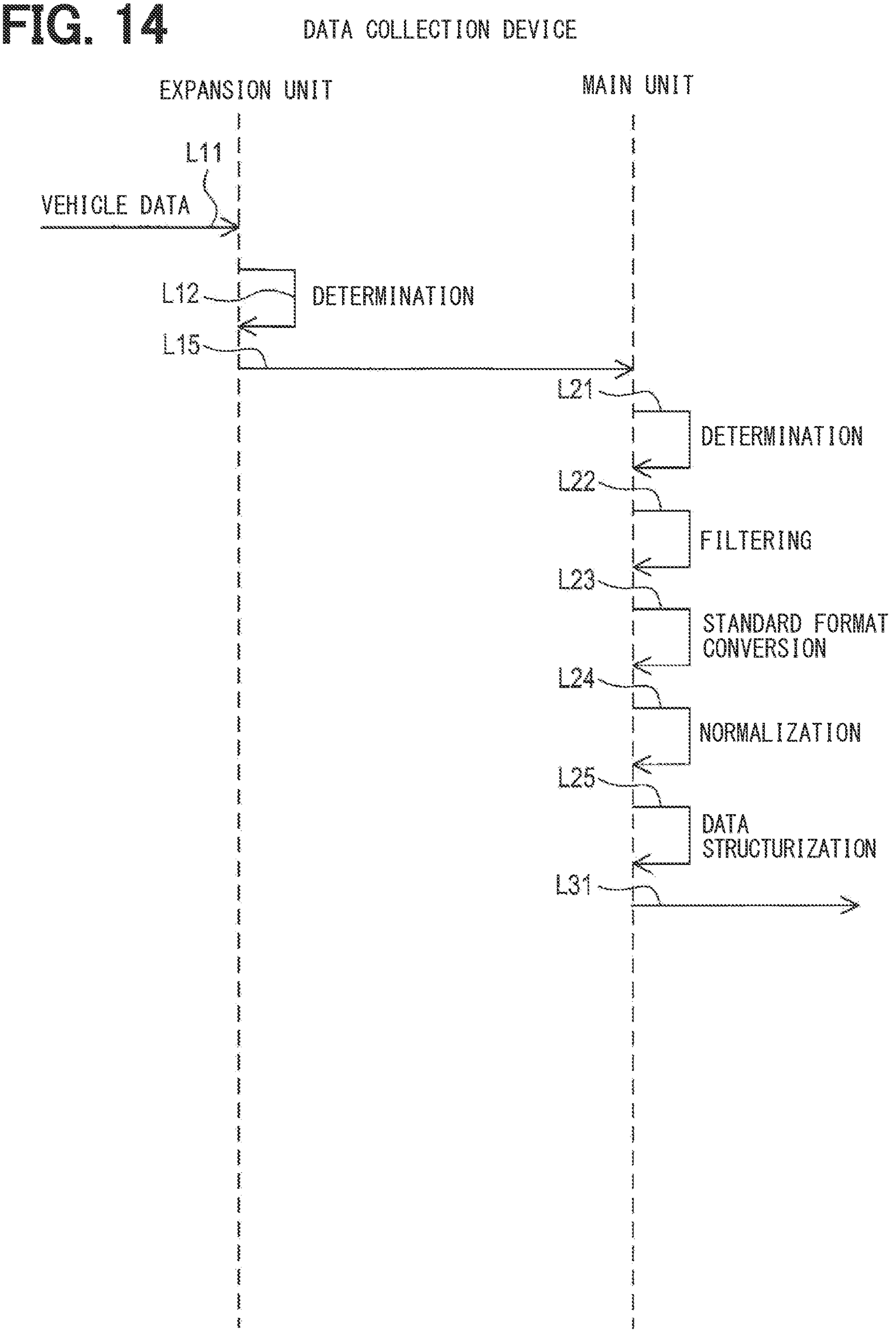
FIG. 14 is a sequence diagram showing a second creation procedure of the standardized vehicle data.

By the way, as a result of the determination at the arrow L12, if it is determined that the expansion unit 2B does not process the data, the filtering at the arrow L13 and the standard format conversion at the arrow L14 are omitted. In this case, as shown in FIG. 14, the output I/F 155B of the expansion unit 2B sends the data as it is to the main body 2A.

In this case, after the main body 2A makes various determinations as indicated by the arrow L21, the filtering unit 20B performs filtering as indicated by the arrow L22. Subsequently, the standardization unit 20C performs standard format conversion as indicated by the arrow L23. Subsequently, the normalization unit 20D performs normalization indicated by the arrow L24. Subsequently, the structurization unit 20E performs data structuring as indicated by the arrow L25.

The filtering performed by the main body 2A at the arrow L22 is the same processing as the filtering performed by the expansion unit 2B at the arrow L13. Further, the standard format conversion at the arrow L23 performed by the main body 2A is the same processing as the standard format conversion at the arrow L13 performed by the expansion unit 2B. Further, when it is determined that the expansion unit 2B should perform filtering on the data, the main body 2A omits the filtering.

Figure 13:
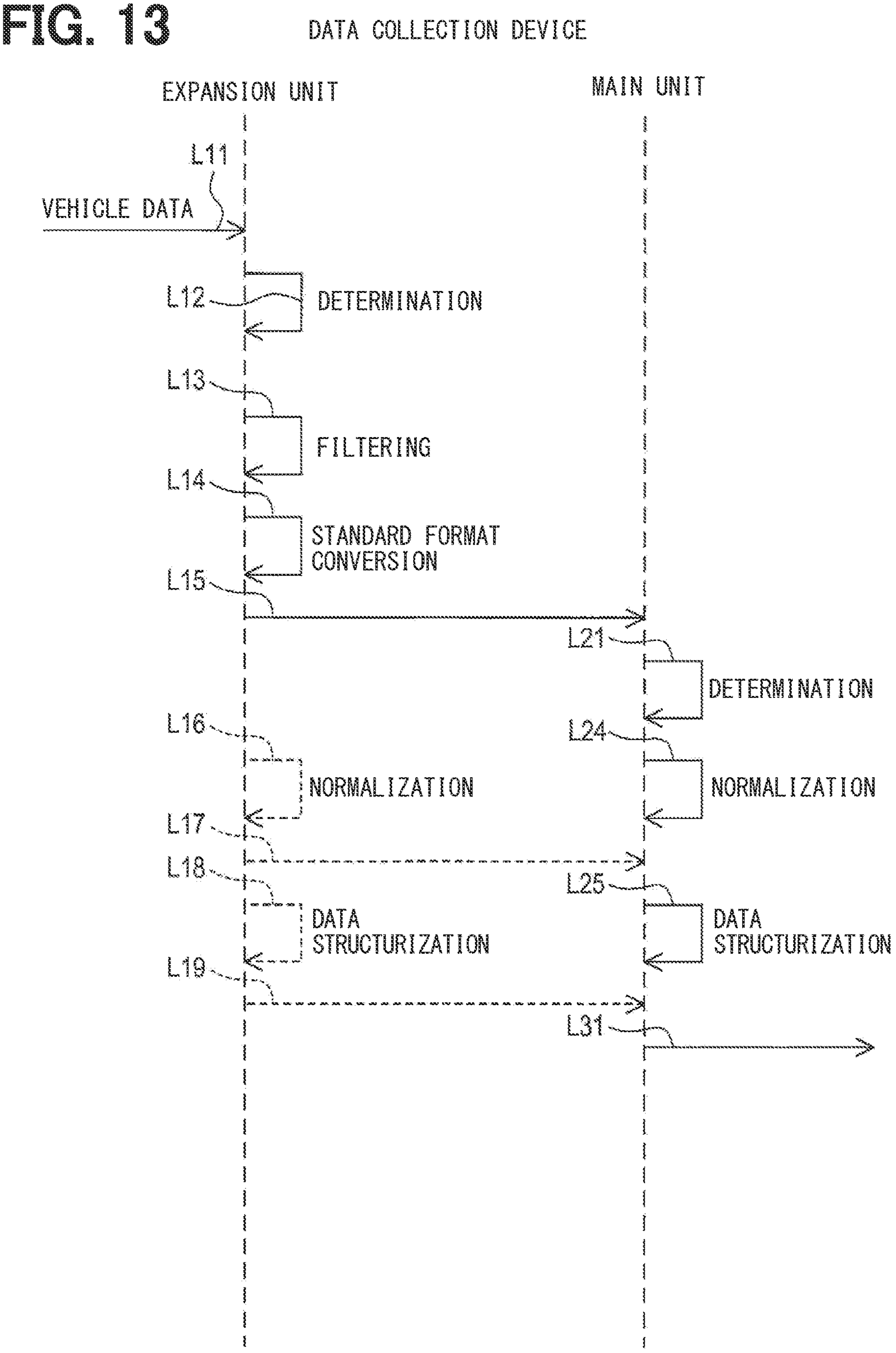
FIG. 13 is a sequence diagram showing a first creation procedure of the standardized vehicle data.

As indicated by the broken line in FIG. 13, the expansion unit 2B may perform the normalization indicated by the arrow L16. In this case, as indicated by the arrow L17, the normalized data is sent to the main body 2A. Further, the expansion unit 2B may perform data structuring as indicated by the arrow L18. In this case, as indicated by the arrow L19, the data after data structuring is sent to the main body 2A.

(1-5. Effects)

According to a first embodiment described in detail above, the following effects are achieved. [0155] (1a) One aspect of the present disclosure is an expansion unit 2B that is configured to be detachably attached to the main body 2A that can communicate with a cloud server via a communication device. The expansion unit 2B includes at least one of the input lines 152C to 152H, at least one of the output lines 151A to 151F, and at least one of the connectors 150A to 190A. Further, the expansion unit 2B includes the determination unit 156A, the filtering unit 156B, and the standardization unit 156C as processing units.

The input lines 152C to 152H are provided for each input data communication protocol, and input data is input thereto. The output lines 151A to 151F are provided for each communication protocol of output data, and output data is output therefrom. The connectors 150A to 190A are configured to connect the output lines 151A to 151F to the main body 2A. The processing unit is configured to perform processing on input data and output output data based on the input data from output lines 151A to 151F.

According to such configuration, the expansion unit 2B can process input data and send output data to the main body 2A via the connectors 150A to 190A. Therefore, new functions can be added to the main body 2A by simply connecting the expansion unit 2B to the main body 2A by using the connectors 150A to 190A.

Further, according to such a configuration, the expansion unit can absorb differences in the functions of the hardware of each vehicle. For example, when there are vehicles including a camera only and vehicles including a camera and a millimeter wave radar, the main body 2A can be configured to receive target object information. In this case, if the expansion unit 2B processes camera signals and millimeter wave signals and outputs target object information, the main body 2A can acquire and process only target object information, regardless of whether the vehicle includes a millimeter wave radar. In other words, the main body 2A can be made less susceptible to differences in equipment between vehicles.

(1b) In one aspect of the present disclosure, the data collection device 2 provided with the main body 2A mounted on a vehicle and the multiple expansion units 2B configured to be detachably attached to the main body 2A executes a data processing method. In the data processing method, input data is acquired from a provider device that is a provider of input data. Then, first processing, which is processing of reducing the amount of data, is performed on the input data. Furthermore, second processing is performed to convert the data after the first processing into data in a preset format.

Further, third processing is performed to convert the data after the second processing into data whose meaning can be understood without comparing the data with other data. Further, the data after the third processing is provided to the management center 3.

According to such a method, it is possible to provide the management center 3 with data that has been converted into data whose meaning can be understood through the first processing, second processing, and third processing. Therefore, compared to the case where the management center 3 performs the first to third processing, the processing load on the management center 3 can be reduced. Further, since the expansion unit 2B is provided, new functions can be added to the main body 2A simply by connecting the expansion unit 2B to the main body 2A.

(1c) In one aspect of the present disclosure, the expansion unit 2B acquires input data from a provider device and performs the first processing and the second processing. The main body 2A acquires the data after the second processing, performs the third processing, and provides the data after the third processing to the management center 3. The provider device indicates, for example, another ECU, the radar 165, the cameras 166 and 185, the microphones 167 and 187, the acceleration sensor 168, the display 175, the GPS antenna 186, the touch panel 188, the speaker 189, or any of the antennas 195A to 195C.

According to such a method, since the expansion unit 2B performs the first processing and the second processing, reduces the amount of data, and then provides the data to the main body 2A, it is possible to reduce the processing load on the main body 2A.

(1d) In one aspect of the present disclosure, the expansion unit 2B determines the capability of the main body 2A based on the communication protocol, the types of the connectors 150A to 190A, and the like. When it is determined that the main body 2A has a preset capability, the expansion unit 2B transmits unprocessed data that is the input data on which the expansion unit 2B does not perform the first processing and the second processing to the main body 2A. When it is determined that the main body 2A does not have the preset capability, the expansion unit 2B performs the first processing and the second processing on the input data, and transmits the data after the second processing to the main body 2A.

When the unprocessed data is received, the main body 2A performs the first processing, the second processing, and the third processing, and provides the data after the third processing to the management center 3. Further, when the data after the second processing is received, the main body 2A performs the third processing and provides the data after the third processing to the management center 3.

According to such a method, it is possible to select which processing the expansion unit 2B will perform depending on the capability of the main body 2A.

(1e) In one aspect of the present disclosure, the expansion unit 2B may omit the first processing depending on the type of input data.

According to such a method, the first processing can be omitted when there is no need to reduce the amount of data or when it is better not to reduce the amount of data.

(1f) In one aspect of the present disclosure, when the communication protocol used for communication with the main body 2A is a preset protocol, the expansion unit 2B omits the first processing.

According to such a method, the first processing can be omitted depending on the communication protocol. When the expansion unit 2B uses a predetermined communication protocol, it is possible to determine that the capability of the main body 2A is high.

(1g) In one aspect of the present disclosure, when the type of the connectors 150A to 190A used for connection with the main body 2A is a preset type, the expansion unit 2B omits the first processing.

According to such a method, the first processing can be omitted depending on the type of connectors 150A to 190A. The expansion unit 2B can determine the capability of the main body 2A depending on the type of the connectors 150A to 190A.

(1h) In one aspect of the present disclosure, when the type of image included in the input data is a preset type, the expansion unit 2B omits the first processing.

According to such a method, it is possible to omit the first processing depending on the type of image. Since there may be no need to reduce the amount of data depending on the type of image, it is possible to omit the processing.

(1i) In one aspect of the present disclosure, fourth processing is performed in which data after the third processing is arranged into a data structure. The data after the fourth processing is then provided to the management center 3.

According to such a method, the data after data structuring can be provided to the management center 3.

(1j) In one aspect of the present disclosure, the data after the fourth processing is periodically provided to the management center 3.

According to such a method, the data after data structuring can be repeatedly and periodically provided to the management center 3.

(1k) In one aspect of the present disclosure, the filtering unit 156B performs the first processing on the input data, which is processing of reducing the amount of data.

According to such a configuration, since the filtering unit 156B performs the first processing, the amount of data transmitted to the main body 2A can be reduced, and the processing load on the main body 2A can be reduced.

(1l) In one aspect of the present disclosure, the filtering unit 156B acquires capture data from the cameras 166 and 185 as input data, and performs processing of recognizing an object from the capture data as the first processing.

According to such a configuration, the capture data can be converted into an object recognition result and then output to the main body 2A. Therefore, the processing by the main body 2A can be reduced compared to the case where the main body 2A performs the processing.

(1 m) In one aspect of the present disclosure, the filtering unit 156B acquires audio data as input data, and performs processing of recognizing the content of the audio from the audio data as the first processing.

According to such a configuration, the audio data can be converted into an audio recognition result and then output to the main body 2A. Therefore, the processing by the main body 2A can be reduced compared to the case where the main body 2A performs the processing.

(1n) In one aspect of the present disclosure, the filtering unit 156B acquires, as input data, obstacle data from the obstacle sensor that detects obstacles around the vehicle, and performs processing of recognizing at least the position of an obstacle from the obstacle data as the first processing.

According to such a configuration, the obstacle data can be converted into an obstacle recognition result and then output to the main body 2A. Therefore, the processing by the main body 2A can be reduced compared to the case where the main body 2A performs the processing.

(1o) In one aspect of the present disclosure, the filtering unit 156B acquires device data obtained from a short distance device as input data, and performs processing of extracting device data obtained from a preset short distance device from the input data as the first processing.

According to such a configuration, device data obtained from a preset short distance device can be extracted and output to the main body 2A. Therefore, the communication amount of data transmitted to the main body 2A can be suppressed.

(1 p) In one aspect of the present disclosure, the filtering unit 156B acquires cloud data obtained from a cloud server as input data, and performs processing of extracting the cloud data obtained from a preset cloud server from the input data as the first processing.

According to such a configuration, cloud data obtained from a preset cloud server can be extracted and output to the main body 2A. Therefore, the communication amount of data transmitted to the main body 2A can be suppressed.

(1q) In one aspect of the present disclosure, the filtering unit 156B acquires CAN data according to the communication protocol CAN as input data, and performs CAN data extraction processing of extracting a preset type of CAN data from the input data as the first processing.

According to such a configuration, a preset type of CAN data can be extracted and output to the main body 2A. Therefore, the communication amount of data transmitted to the main body 2A can be suppressed.

(1r) In one aspect of the present disclosure, the standardization unit 156C performs second processing of converting the data after the first processing into data in a preset format that can be handled by the main body 2A, and the output I/F 155B sends the data after the second processing to the output lines 151A to 151F as output data.

According to such a configuration, since the second processing is performed to format the data after the first processing and then the data is transmitted to the main body 2A, it is possible to easily handle the output data by the main body 2A.

(1s) In one aspect of the present disclosure, as the second processing, the standardization unit 156C performs processing of converting the data after the first processing into a data format conforming to CAN data.

According to such a configuration, since the data is converted into a data format conforming to CAN data that can be widely handled by the main body 2A, it is possible to easily handle the data by the main body 2A.

(1t) In one aspect of the present disclosure, as the second processing, the standardization unit 156C performs processing of converting the data after the first processing into data including an ID indicating the data type, data amount information, actual data, and an error correction code.

According to such a configuration, since data including information required by the main body 2A is sent in advance, it is possible to easily handle the data by the main body 2A.

(1u) In one aspect of the present disclosure, the number of the input lines 152C to 152H is set to be smaller than the number of the output lines 151A to 151F.

According to such a configuration, even when the number of interfaces of the main body 2A, that is, the number of the output lines 151A to 151F is small, it is possible to send output data based on many types of input data to the main body 2A.

(1v) One aspect of the present disclosure is the data collection device 2. The data collection device 2 includes the main body 2A and the multiple expansion units 2B. The main body 2A is mounted on a vehicle. The multiple expansion units 2B include at least the network expansion unit 190 and the vehicle expansion unit 150. The network expansion unit 190 uses data obtained from a communication device located outside the vehicle as input data. The vehicle expansion unit 150 uses, as input data, data obtained from the vehicle side instrument 2C located inside the vehicle. The network expansion unit 190 and the vehicle expansion unit 150 include a processing unit configured to process input data and output output data based on the input data to the main body 2A.

According to such a configuration, multiple expansion units 150, 190, and the like for inputting data from outside the vehicle and data from inside the vehicle can be connected to the main body 2A.

2. Other Embodiments

Although the embodiment of the present disclosure is described above, the present disclosure is not limited to the embodiment described above, and various modifications can be made to implement the present disclosure.

(2a) In the above embodiment, the number of the input lines 152C to 152H is configured to be larger than the number of the output lines 151A to 151F, but the present disclosure is not limited thereto. For example, the number of the input lines 152C to 152H may be configured to be smaller than the number of the output lines 151A to 151F.

According to such a configuration, by preparing a large number of the output lines 151A, it is possible to support a larger number of communication protocols. Therefore, even when there are only a few types of communication protocols that can be supported by the interface of the main body 2A, the expansion unit 2B can easily select a protocol with which the main body 2A can communicate.

(2b) In the above embodiment, the main body 2A and the expansion unit 2B include the determination units 20A and 156A, the filtering units 20B and 156B, and the standardization units 20C and 156C as partially overlapping functions, but the present disclosure is not limited to this configuration. For example, the determination units 20A and 156A, the filtering units 20B and 156B, and the standardization units 20C and 156C may be provided only in the expansion unit 2B.

For example, when the main body 2A is not equipped with object recognition software, the expansion unit 2B equipped with object recognition software can be attached to the main body 2A, and the expansion unit 2B can be configured to transmit recognition results to the main body 2A.

(2c) In the embodiment described above, the determination units 20A and 156A determine the processing that can be performed by the expansion unit 2B and set the processing to be performed, but the present disclosure is not limited to this configuration. For example, the determination units 20A and 156A may refer to a table prepared in advance (for example, a table as shown in FIG. 8) taking into consideration the software installed in the expansion unit 2B and perform processing according to this table (that is, the configuration).

In other words, the expansion unit 2B sets whether to perform the processing on the input data by referring to a preset table, and when it is set not to perform the processing on the input data, the expansion unit 2B may transmit unprocessed data that is the input data on which the expansion unit 2B does not perform the first processing and the second processing to the main body 2A. Further, when the expansion unit 2B is set to perform the processing, the expansion unit 2B may perform the first processing and the second processing on the input data, and transmit the data after the second processing to the main body 2A.

Figure 15:
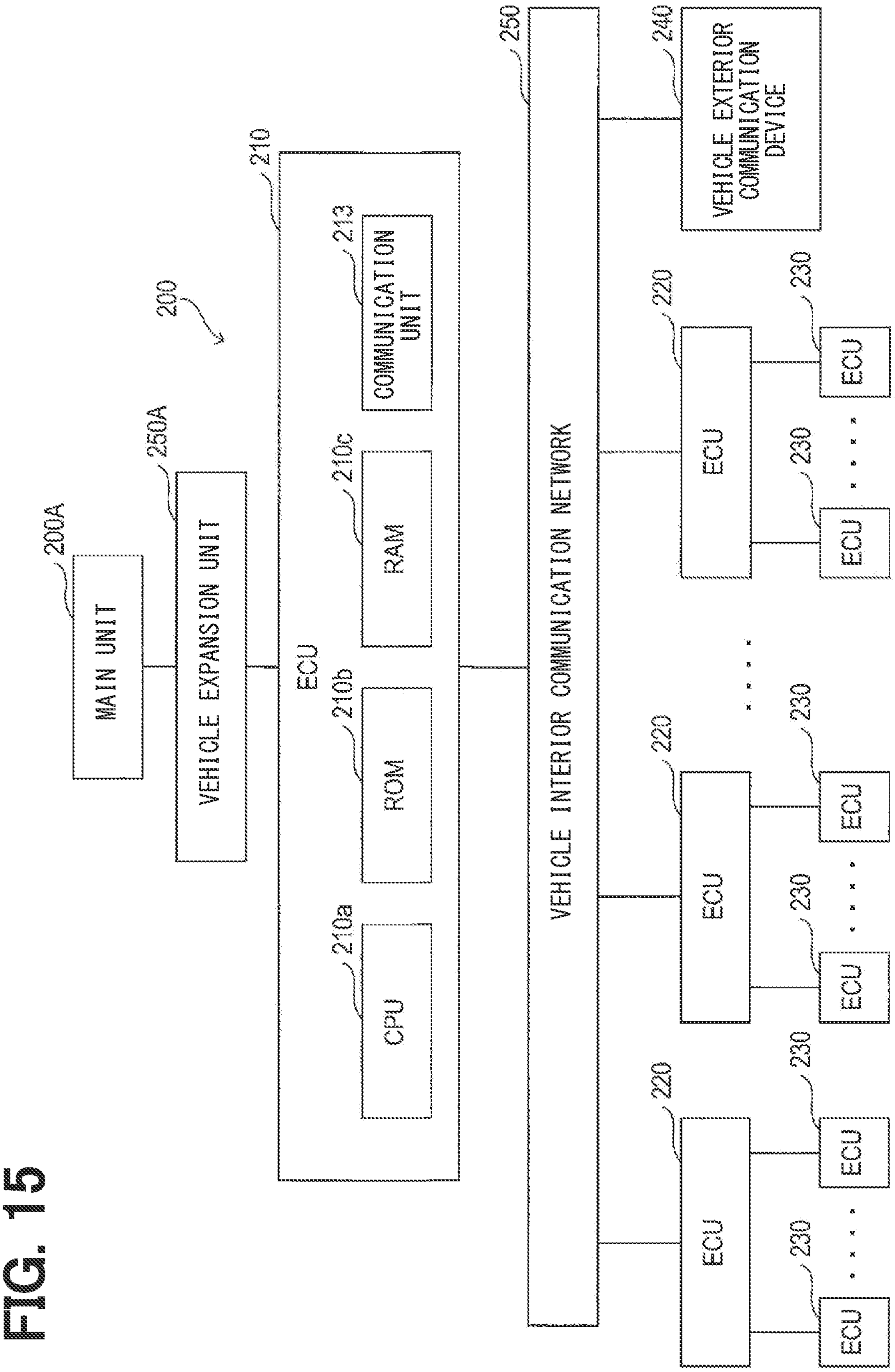
FIG. 15 is a block diagram showing a connection state of an ECU mounted on a vehicle.

(2d) As shown in FIG. 15, the vehicle may include a data collection device 200 instead of the data collection device 2. The data collection device 200 may include one ECU (electronic control unit) 210, multiple ECUs 220, multiple ECUs 230, an external communication device 240, and a vehicle interior communication network 250. The data collection device 200 may be communicably connected to a main body 200A similar to the above-described main body 2A via a vehicle expansion unit 250A similar to the above-described expansion unit 2B.

The ECU 210 controls multiple ECUs 220 to achieve coordinated control of the entire vehicle. Further, the ECU 210 realizes a function of processing data received from other electronic control devices or outputting the data as it is to the vehicle expansion unit 250A.

The ECU 220 is provided for each domain divided by function in the vehicle, and mainly controls the multiple ECUs 230 existing within that domain. Each ECU 220 is connected to the ECU 230 under the control thereof via an individually provided lower layer network (for example, CAN). The ECU 220 has a function of centrally managing access authority of the ECU 230 under the control thereof and authenticating users. The domain includes, for example, power train, body, chassis, cockpit, and the like.

The ECU 230 connected to the ECU 220 belonging to the power train domain includes, for example, the ECU 230 that controls an engine, the ECU 230 that controls a motor, the ECU 230 that controls a battery, and the like.

The ECU 230 connected to the ECU 220 belonging to the body domain includes, for example, the ECU 230 that controls an air conditioner, the ECU 230 that controls a door, and the like.

The ECU 230 connected to the ECU 220 belonging to the chassis domain includes, for example, the ECU 230 that controls brakes, the ECU 230 that controls steering, and the like.

The ECU 230 connected to the ECU 220 belonging to the cockpit domain includes, for example, the ECU 230 that controls meter and navigation displays, the ECU 230 that controls input devices operated by a vehicle occupant, and the like.

The external communication device 240 performs data communication with a communication device outside the vehicle (for example, a cloud server) via the wide area wireless communication network NW.

The vehicle interior communication network 250 includes CAN FD and Ethernet. CAN FD connects ECU 210 to each ECU 220 and the external communication device 240 via a bus. Ethernet connects ECU 210 and each ECU 220 and the external communication device 240 individually.

The ECU 210 is an electronic control device mainly composed of a microcomputer including a CPU 210*a*, a ROM 210*b*, a RAM 210*c*, and the like. Various functions of the microcomputer are implemented by the CPU 210*a* executing programs stored in a non-transient physical recording medium. In this example, the ROM 210*b* corresponds to a non-transient physical recording medium that stores a program. Further, a method corresponding to the program is performed by executing the program. Some or all of the functions executed by the CPU 210*a* may be configured in hardware using one or more ICs. Further, the number of the microcomputers constituting the ECU 210 may be one or more.

The ECU 210 further includes the communication unit 213. The communication unit 213 is configured to relay data received from other electronic control devices (for example, ECU 220, 230, and the like) to the vehicle expansion unit 250A.

The ECU 220, the ECU 230, and the external communication device 240 are all electronic control devices mainly composed of a microcomputer provided with a CPU, ROM, RAM, and the like, similarly to the ECU 210. Further, the number of the microcomputers constituting the ECU 220 and ECU 230, and the external communication device 240 may be one or more. The ECU 220 is an ECU that controls one or more ECUs 230, and the ECU 210 is an ECU that controls one or more ECUs 220 or controls the ECUs 220 and 230 of the entire vehicle including the external communication device 240.

The data collection device 2 is connected to the ECU 210 so as to communicate data with the ECU 210. That is, the data collection device 2 receives information from the ECUs 210, 220, and 230 via the ECU 210. Further, the data collection device 2 transmits a request regarding vehicle control to the ECU 210 or to the ECUs 220 and 230 via the ECU 210.

According to such a configuration, the same effect as the above (1a) can be obtained.

Figure 16:
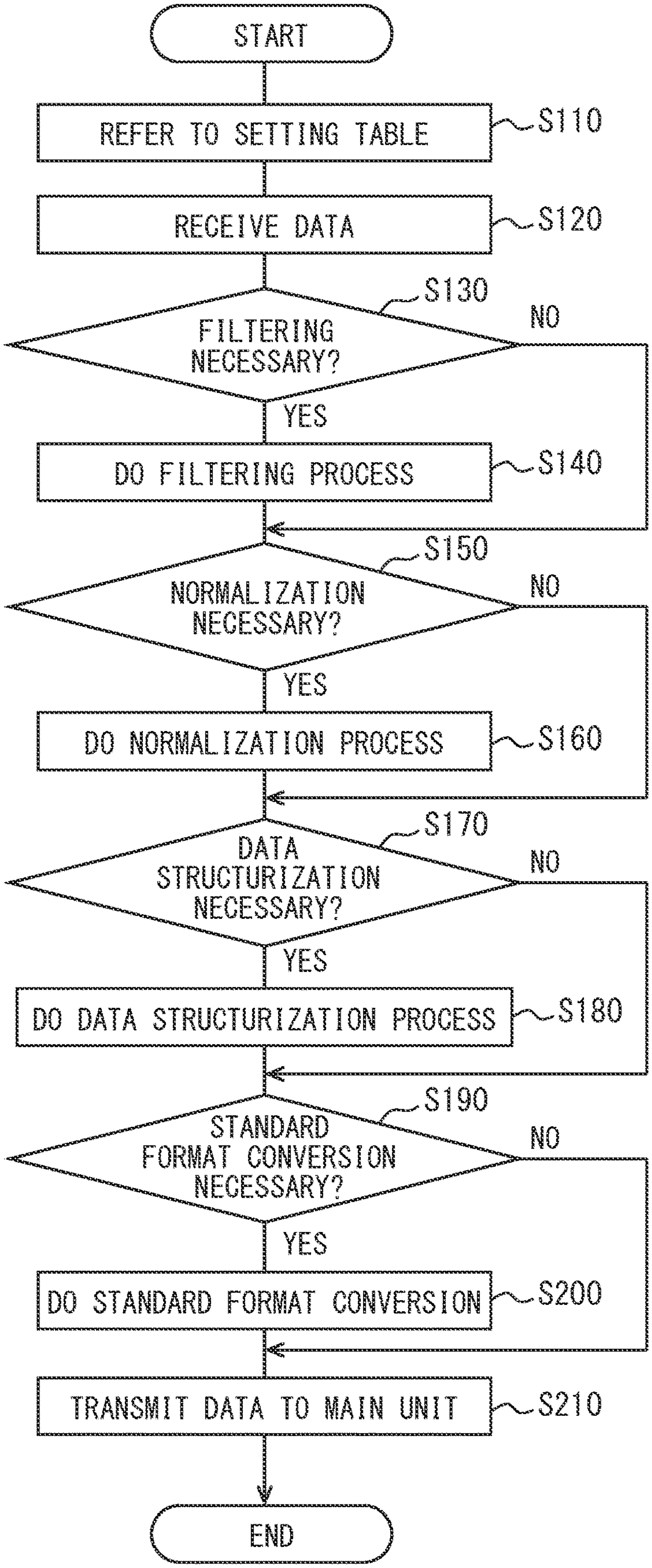
FIG. 16 is a flowchart showing data creation processing executed by the vehicle expansion unit.
Figure 17:
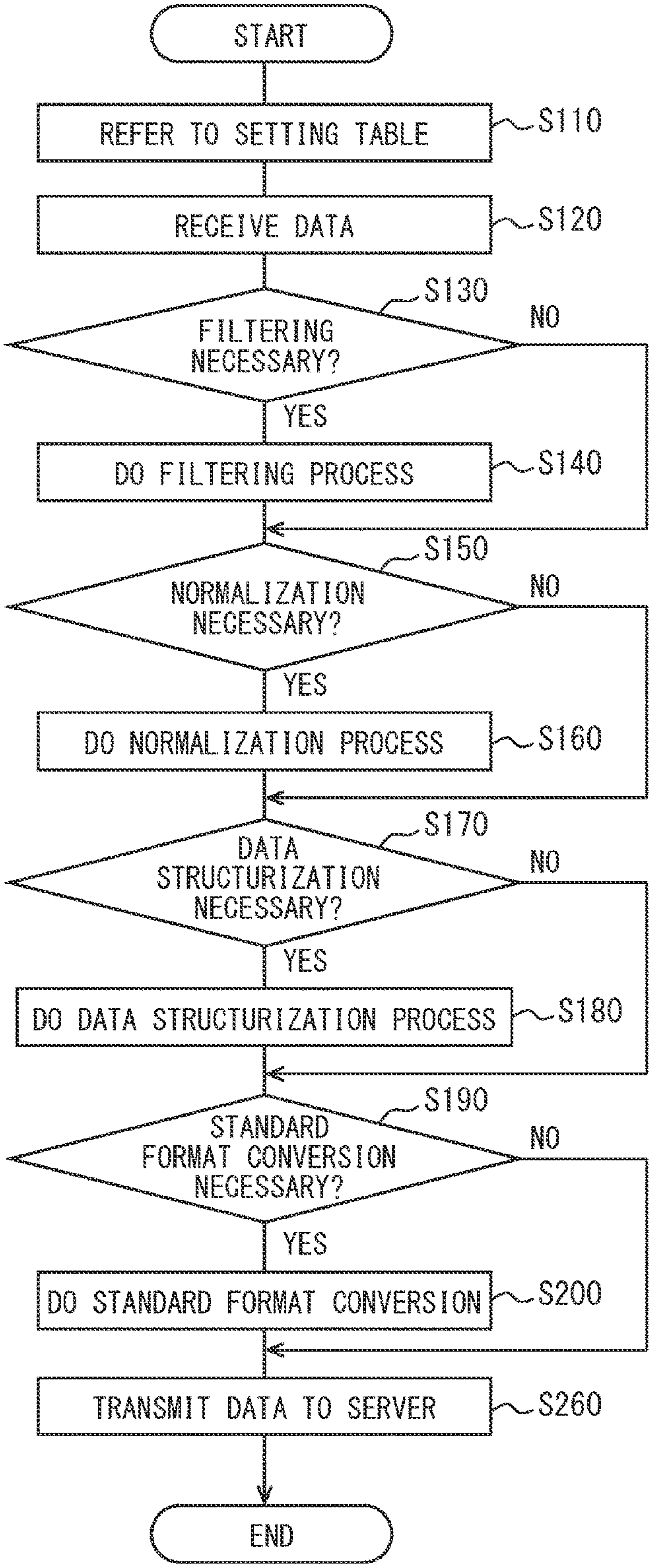
FIG. 17 is a flowchart showing data creation processing executed by the main body.

(2e) The procedure for the data collection device 2 to create standardized vehicle data described in FIG. 13 may be implemented as shown in the flowcharts shown in FIGS. 16 and 17. FIG. 16 is a flowchart showing the data creation processing executed by the expansion unit 2B (for example, vehicle expansion unit 150, and the like), and FIG. 17 is a flowchart showing the data creation processing executed by the main body 2A. In FIGS. 16 and 17, a case will be described in which the main body 2A and the expansion unit 2B can each execute all of the procedures from L11 to L15, L21 to L25, and L31 shown in FIG. 13. Among the processing illustrated in FIGS. 16 and 17, for functions that the main body 2A and the expansion unit 2B do not have, the corresponding processing may be omitted, or the configuration may be such that a negative determination is made in the determination processing (that is, S130, S150, S170, S190).

Further, regarding whether normalization and data structuring should be performed in the main body 2A or the vehicle expansion unit 150, the vehicle expansion unit 150 may be provided with a table of setting values equivalent to that shown in FIG. 8 in advance, and the vehicle expansion unit 150 may refer to the table to determine whether to perform the processing. This table of setting values may be stored in advance in the memory of the expansion unit 2B. Alternatively, the expansion unit 2B may acquire the presence or absence of capabilities (functions) of the main body 2A through communication with the main body 2A, and create a table so that the expansion unit 2B performs processing for which the main body 2A does not have the capability.

In the table of setting values, it is preferable that, as in FIG. 8, it is determined whether each processing is to be performed by the expansion unit depending on the communication protocol type and data type.

In FIG. 13, standard format conversion is performed before normalization and data structuring, whereas in FIGS. 16 and 17, standard format conversion is performed after normalization and data structuring. In this way, the processing order of various kinds of processing can be set arbitrarily. Further, when the received data is only relayed without performing any processing, negative determinations are made in all determinations in FIGS. 16 and 17.

In the data creation processing shown in FIG. 16, the expansion unit 2B (for example, the CPU 153 of the vehicle expansion unit 150) refers to a table equivalent to the filtering table 8 (hereinafter, referred to as an expansion table) in S110, and receives vehicle data in S120 (L11). Subsequently, in S130, the vehicle expansion unit 150 determines whether filtering is necessary for the vehicle data based on the expansion table (L12).

When filtering is required, the vehicle expansion unit 150 proceeds to S140 to execute filtering processing (L13), and then proceeds to S150. When filtering is not necessary, the vehicle expansion unit 150 proceeds to S150. In S150, the vehicle expansion unit 150 determines whether normalization is necessary for vehicle data based on the expansion table. If normalization is necessary, the vehicle expansion unit 150 proceeds to S160 to execute normalization processing (L16, L24), and proceeds to S170. When normalization is not necessary, the vehicle expansion unit 150 proceeds to S170.

Subsequently, in S170, the vehicle expansion unit 150 determines whether data structuring is necessary for vehicle data based on the expansion table. If data structuring is necessary, the vehicle expansion unit 150 proceeds to S180 to execute data structuring processing (L18, L25), and then proceeds to S190. If data structuring is not necessary, the vehicle expansion unit 150 proceeds to S190.

Subsequently, in S190, the vehicle expansion unit 150 determines whether standard format conversion is necessary for the vehicle data based on the expansion table. If standard format conversion is necessary, the vehicle expansion unit 150 proceeds to S200 to execute processing related to standard format conversion (L14), and then proceeds to S210. When the standard format conversion is not necessary, the vehicle expansion unit 150 proceeds to S210.

Subsequently, the vehicle expansion unit 150 transmits data to the main body 2A in S210 (L15), and ends this processing.

The data creation processing executed by the main body 2A shown in FIG. 17 is generally similar to the data creation processing executed by the vehicle expansion unit 150 shown in FIG. 16. However, at the time of determination, the filtering table 8 shown in FIG. 8 is referred to instead of the expansion table. Further, instead of the processing in S210, the processing in S260, which will be described later, is performed.

That is, the main body 2A is configured to transmit data to the service provision server 4 (L31) in S260.

(2f) The data collection device 2 (that is, the main body 2A and the expansion unit 2B) and the method thereof described in the present disclosure may be implemented by a dedicated computer provided by configuring a processor and a memory programmed to perform one or multiple functions embodied by a computer program. Alternatively, the data collection device 2 and the method thereof described in the present disclosure may be implemented by a dedicated computer provided by a processor configured with one or more dedicated hardware logic circuits. Alternatively, the data collection device 2 and the method thereof described in the present disclosure may be implemented by one or more dedicated computers configured with a combination of a processor and a memory programmed to perform one or multiple functions and a processor configured with one or more hardware logic circuits. The computer program may be stored in a non-transient physical computer-readable recording medium as an instruction to be executed by a computer. The method for realizing the functions of each part included in the data collection device 2 does not necessarily need to include software, and all the functions may be implemented by using one or more pieces of hardware.

(2g) Multiple functions of one component in the above embodiment may be implemented by multiple components, and a function of one component may be implemented by multiple components. Further, multiple functions possessed by multiple components may be implemented by one component, or one function implemented by multiple components may be implemented by one component. Further, a part of the configuration of the above embodiment may be omitted. At least a part of the configuration of the above embodiment may be added to or substituted by the configuration of another embodiment.

(2h) In addition to the data collection device 2 described above, the present disclosure can also be implemented in various forms, such as a system including the data collection device 2 as a component, a program for causing a computer to function as the data collection device 2, a non-transient physical recording medium such as a semiconductor memory on which this program is recorded, a data processing method, and the like.

The invention claimed is:

1. A data processing method performed by an in-vehicle device unit that includes: an in-vehicle device configured to communicate with a cloud server via a communication device; and an expansion unit that is detachable with the in-vehicle device, the method comprising:

acquiring input data from a provider device that is a provider of the input data;

performing first processing that is processing of reducing a data amount of the input data;

performing second processing of converting data obtained by the first processing into data having a preset format configured to be handled by the in-vehicle device unit;

performing third processing of converting data obtained by the second processing into normalization data configured to be handled by the cloud server; and providing vehicle data to the cloud server based on data obtained by the third processing;

wherein the expansion unit is configured to transmit unprocessed data on which the first processing and the second processing are not performed in the input data to the in-vehicle device in response to determining that the in-vehicle device has a preset capability; and perform the first processing and the second processing on the input data and transmit the data obtained by the second processing to the in-vehicle device in response to determining that the in-vehicle device does not have the preset capability; and the in-vehicle device is configured to perform the first processing, the second processing, and the third processing on the unprocessed data in response to receiving the unprocessed data from the expansion unit;

perform the third processing on the data obtained by the second processing in response to receiving the data obtained by the second processing from the expansion unit; and provide the data obtained by the third processing to the cloud server.

2. The data processing method according to claim 1, wherein the expansion unit is configured to acquire the input data from the provider device, and perform the first processing and the second processing, and the in-vehicle device is configured to acquire the data obtained by the second processing, perform the third processing, and provide the data obtained by the third processing to the cloud server.

3. The data processing method according to claim 2, wherein the expansion unit is configured to omit the first processing according to a type of the input data.

4. The data processing method according to claim 3, wherein the expansion unit omits the first processing when a communication protocol for communication with the in-vehicle device is a preset protocol.

5. The data processing method according to claim 3, wherein the expansion unit omits the first processing when a type of a connector for connection with the in-vehicle device is a preset type.

6. The data processing method according to claim 3, wherein the expansion unit omits the first processing when a type of an image in the input data is a preset type.

7. The data processing method according to claim 1, further comprising:

performing fourth processing of structuring the data obtained by the third processing; and providing data obtained by the fourth processing to the cloud server.

8. The data processing method according to claim 7, further comprising:

periodically providing the data obtained by the fourth processing to the cloud server.

9. The data processing method according to claim 1, further comprising:

acquiring, as the input data, capture data by a camera; and performing, as the first processing, processing of recognizing an object from the capture data.

10. The data processing method according to claim 1, further comprising:

acquiring, as the input data, audio data; and performing, as the first processing, processing of recognizing a content of audio from the audio data.

11. The data processing method according to claim 1, further comprising:

acquiring, as the input data, obstacle data by an obstacle sensor that detects an obstacle in a periphery of a vehicle; and performing, as the first processing, processing of recognizing a position of at least a position of the obstacle from the obstacle data.

12. The data processing method according to claim 1, further comprising:

acquiring, as the input data, device data from a short distance device; and performing, as the first processing, processing of extracting, from the input data, the device data obtained from the short distance device that is preset.

13. The data processing method according to claim 1, further comprising:

acquiring, as the input data, cloud data from the cloud server; and performing, as the first processing, processing of extracting, from the input data, the cloud data obtained from the cloud server that is preset.

14. The data processing method according to claim 1, further comprising:

acquiring, as the input data, data by a network communication protocol; and performing, as the first processing, data extraction processing of extracting network communication protocol data having a preset type from the input data.

15. The data processing method according to claim 1, further comprising:

performing, as the second processing, processing of converting the data obtained by the first processing into a data format conforming to a network communication protocol data.

16. The data processing method according to claim 1, further comprising performing, as the second processing, processing of converting the data obtained by the first processing into data including: ID indicating a data type; an information data amount; actual data; and an error correction code.

17. The data processing method according to claim 1, wherein the expansion unit is configured to acquire the input data from the provider device, and perform the first processing, the second processing, and the third processing, and the in-vehicle device is configured to acquire the data obtained by the third processing, and provide the data obtained by the third processing to the cloud server.

18. The data processing method according to claim 1, wherein the expansion unit is configured to acquire the input data from the provider device, and perform the first processing, and the in-vehicle device is configured to acquire the data obtained by the first processing, perform the second processing and the third processing, and provide the data obtained by the third processing to the cloud server.

19. The data processing method according to claim 1, wherein the expansion unit is configured to acquire the input data from the provider device, and the in-vehicle device is configured to acquire the input data from the expansion unit, perform the first processing, the second processing, and the third processing, and provide the data obtained by the third processing to the cloud server.

20. A communication system comprising:

an in-vehicle device configured to communicate with a cloud server via a communication device;

an expansion unit that is detachable with the in-vehicle device;

an acquisition unit configured to acquire input data from a provider device that is a provider of the input data;

a first processing unit configured to perform first processing that is processing of reducing a data amount of the input data;

a second processing unit configured to perform second processing of converting data obtained by the first processing into data having a preset format configured to be handled by the in-vehicle device;

a third processing unit configured to perform third processing of converting data obtained by the second processing into normalization data configured to be handled by the cloud server; and a provision unit configured to provide vehicle data to the cloud server based on data obtained by the third processing;

wherein the expansion unit is configured to transmit unprocessed data on which the first processing and the second processing are not performed in the input data to the in-vehicle device in response to determining that the in-vehicle device has a preset capability; and perform the first processing and the second processing on the input data and transmit the data obtained by the second processing to the in-vehicle device in response to determining that the in-vehicle device does not have the preset capability; and the in-vehicle device is configured to perform the first processing, the second processing, and the third processing on the unprocessed data in response to receiving the unprocessed data from the expansion unit;

perform the third processing on the data obtained by the second processing in response to receiving the data obtained by the second processing from the expansion unit; and provide the data obtained by the third processing to the cloud server.

21. A communication system comprising:

an in-vehicle device configured to communicate with a cloud server via a communication device;

an expansion unit that is detachable with the in-vehicle device;

an electronic control unit configured to output data to the expansion unit;

a relay unit configured to relay, to the expansion unit, data transmitted from a different electronic control unit;

an acquisition unit configured to acquire input data transmitted from the relay unit;

a first processing unit configured to perform first processing that is processing of reducing a data amount of the input data;

a second processing unit configured to perform second processing of converting data obtained by the first processing into data having a preset format configured to be handled by the in-vehicle device;

a third processing unit configured to perform third processing of converting data obtained by the second processing into normalization data configured to be handled by the cloud server; and a provision unit configured to provide vehicle data to the cloud server based on data obtained by the third processing;

wherein the expansion unit is configured to transmit unprocessed data on which the first processing and the second processing are not performed in the input data to the in-vehicle device in response to determining that the in-vehicle device has a preset capability; and perform the first processing and the second processing on the input data and transmit the data obtained by the second processing to the in-vehicle device in response to determining that the in-vehicle device does not have the preset capability; and the in-vehicle device is configured to perform the first processing, the second processing, and the third processing on the unprocessed data in response to receiving the unprocessed data from the expansion unit;

perform the third processing on the data obtained by the second processing in response to receiving the data obtained by the second processing from the expansion unit; and provide the data obtained by the third processing to the cloud server.

22. A data processing method performed by an in-vehicle device unit that includes: an in-vehicle device configured to communicate with a cloud server via a communication device; and an expansion unit that is detachable with the in-vehicle device, the method comprising:

acquiring input data from a provider device that is a provider of the input data;

performing first processing that is processing of reducing a data amount of the input data;

performing second processing of converting data obtained by the first processing into data having a preset format configured to be handled by the in-vehicle device unit;

performing third processing of converting data obtained by the second processing into normalization data configured to be handled by the cloud server; and providing vehicle data to the cloud server based on data obtained by the third processing;

wherein the expansion unit is configured to transmit, to the in-vehicle device, unprocessed data on which the first processing and the second processing are not performed in the input data in response to setting not to perform processing of the input data, and perform the first processing and the second processing on the input data when determining to perform the processing, and transmit the data obtained by the second processing to the in-vehicle device, and the in-vehicle device is configured to perform the first processing, the second processing, and the third processing when receiving the unprocessed data, provide the data obtained by the third processing to the cloud server, perform the third processing when receiving the data obtained by the second processing, and provide the data obtained by the third processing to the cloud server.

23. A communication system comprising:

an in-vehicle device configured to communicate with a cloud server via a communication device;

an expansion unit that is detachable with the in-vehicle device;

an acquisition unit configured to acquire input data from a provider device that is a provider of the input data;

a first processing unit configured to perform first processing that is processing of reducing a data amount of the input data;

a second processing unit configured to perform second processing of converting data obtained by the first processing into data having a preset format configured to be handled by the in-vehicle device;

a third processing unit configured to perform third processing of converting data obtained by the second processing into normalization data configured to be handled by the cloud server; and a provision unit configured to provide vehicle data to the cloud server based on data obtained by the third processing;

wherein the expansion unit is configured to transmit, to the in-vehicle device, unprocessed data on which the first processing and the second processing are not performed in the input data in response to setting not to perform processing of the input data, and perform the first processing and the second processing on the input data when determining to perform the processing, and transmit the data obtained by the second processing to the in-vehicle device, and the in-vehicle device is configured to perform the first processing, the second processing, and the third processing when receiving the unprocessed data, provide the data obtained by the third processing to the cloud server, perform the third processing when receiving the data obtained by the second processing, and provide the data obtained by the third processing to the cloud server.

24. A communication system comprising:

an in-vehicle device configured to communicate with a cloud server via a communication device;

an expansion unit that is detachable with the in-vehicle device;

an electronic control unit configured to output data to the expansion unit;

a relay unit configured to relay, to the expansion unit, data transmitted from a different electronic control unit;

an acquisition unit configured to acquire input data transmitted from the relay unit;

a first processing unit configured to perform first processing that is processing of reducing a data amount of the input data;

a second processing unit configured to perform second processing of converting data obtained by the first processing into data having a preset format configured to be handled by the in-vehicle device;

a third processing unit configured to perform third processing of converting data obtained by the second processing into normalization data configured to be handled by the cloud server; and a provision unit configured to provide vehicle data to the cloud server based on data obtained by the third processing;

wherein the expansion unit is configured to transmit, to the in-vehicle device, unprocessed data on which the first processing and the second processing are not performed in the input data in response to setting not to perform processing of the input data, and perform the first processing and the second processing on the input data when determining to perform the processing, and transmit the data obtained by the second processing to the in-vehicle device, and the in-vehicle device is configured to perform the first processing, the second processing, and the third processing when receiving the unprocessed data, provide the data obtained by the third processing to the cloud server, perform the third processing when receiving the data obtained by the second processing, and provide the data obtained by the third processing to the cloud server.

* * * * *